US008263713B2

(12) United States Patent
Willis

(10) Patent No.: US 8,263,713 B2
(45) Date of Patent: Sep. 11, 2012

(54) AMINE NEUTRALIZED SULFONATED BLOCK COPOLYMERS AND METHOD FOR MAKING SAME

(75) Inventor: Carl Lesley Willis, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 272 days.

(21) Appl. No.: 12/578,401

(22) Filed: Oct. 13, 2009

(65) Prior Publication Data

US 2011/0086982 A1    Apr. 14, 2011

(51) Int. Cl.
*C08F 8/36*    (2006.01)
*C08F 6/14*    (2006.01)
*C08F 8/32*    (2006.01)

(52) U.S. Cl. .................................... 525/333.5; 528/492
(58) Field of Classification Search ................ 525/333.5
See application file for complete search history.

(56) References Cited

U.S. PATENT DOCUMENTS

| | | |
|---|---|---|
| 2,854,425 A | 9/1958 | Bogel et al. |
| 3,149,182 A | 9/1964 | Porter |
| 3,281,257 A | 10/1966 | Shy |
| 3,450,795 A | 6/1969 | Langer |
| 3,494,942 A | 2/1970 | Miki et al. |
| 3,577,357 A | 5/1971 | Winkler |
| RE27,145 E | 6/1971 | Jones |
| 3,595,942 A | 7/1971 | Wald et al. |
| 3,634,594 A | 1/1972 | Hiyama |
| 3,670,054 A | 6/1972 | De Le Mare et al. |
| 3,682,768 A | 8/1972 | Adams et al. |
| 3,700,633 A | 10/1972 | Wald et al. |
| 3,735,559 A | 5/1973 | Salemme |
| 3,783,072 A | 1/1974 | Korpman |
| 3,867,247 A * | 2/1975 | O'Farrell et al. ............. 442/232 |
| 3,914,340 A | 10/1975 | Dekking |
| 3,985,830 A | 10/1976 | Fetters et al. |
| 4,039,593 A | 8/1977 | Kamienski et al. |
| 4,107,236 A | 8/1978 | Nayla et al. |
| 4,224,418 A * | 9/1980 | Dieterich et al. ............. 521/170 |
| 4,313,867 A | 2/1982 | Duvdenvani |
| 4,365,023 A | 12/1982 | Fujimoto |
| 4,391,949 A | 7/1983 | St. Clair |
| 4,444,953 A | 4/1984 | St. Clair |
| 4,678,025 A | 7/1987 | Oberlander et al. |
| 4,728,429 A | 3/1988 | Cabasso et al. |
| 4,766,161 A | 8/1988 | Chlanda et al. |
| 4,797,318 A | 1/1989 | Brooker et al. |
| 4,931,070 A | 6/1990 | Prasad |
| 4,934,148 A | 6/1990 | Prasad et al. |
| 4,944,776 A | 7/1990 | Keyser et al. |
| 4,946,899 A | 8/1990 | Kennedy et al. |
| 5,095,054 A | 3/1992 | Lay et al. |
| 5,145,748 A | 9/1992 | Gaidis et al. |
| 5,239,010 A | 8/1993 | Balas et al. |
| 5,276,100 A * | 1/1994 | Coolbaugh et al. ........... 525/314 |
| 5,288,773 A | 2/1994 | Gorbaty et al. |
| 5,340,387 A | 8/1994 | Smith |
| 5,348,691 A | 9/1994 | McElroy et al. |
| 5,389,711 A | 2/1995 | Westbrook et al. |
| 5,468,574 A | 11/1995 | Ehrenberg et al. |
| 5,516,831 A | 5/1996 | Pottick et al. |
| 5,620,500 A | 4/1997 | Fukui et al. |
| 5,677,074 A | 10/1997 | Serpico et al. |
| 5,679,482 A | 10/1997 | Ehrenberg et al. |
| 5,679,745 A | 10/1997 | Hamada et al. |
| 5,709,921 A | 1/1998 | Shawer |
| 5,785,117 A | 7/1998 | Grinbergs |
| 5,827,602 A | 10/1998 | Koch et al. |
| 5,840,387 A | 11/1998 | Berlowitz-Tarrant et al. |
| 5,925,621 A | 7/1999 | Zaneveld et al. |
| 6,028,115 A | 2/2000 | Zaneveld et al. |
| 6,033,804 A | 3/2000 | Doyle et al. |
| 6,145,588 A | 11/2000 | Martin et al. |
| 6,239,182 B1 | 5/2001 | Zaneveld et al. |
| 6,306,419 B1 | 10/2001 | Vachon et al. |
| 6,391,981 B1 | 5/2002 | Willis et al. |
| 6,413,298 B1 | 7/2002 | Wnek et al. |
| 6,444,767 B1 | 9/2002 | Schade et al. |
| 6,455,651 B1 | 9/2002 | Willis et al. |
| 6,492,469 B2 | 12/2002 | Willis et al. |
| 6,515,083 B2 | 2/2003 | Ozawa et al. |
| 6,531,241 B1 | 3/2003 | McEwen |
| 6,536,514 B1 | 3/2003 | Sugiyama et al. |
| 6,537,538 B2 | 3/2003 | Zaneveld et al. |
| 6,579,948 B1 | 6/2003 | Tan et al. |
| 6,664,309 B2 | 12/2003 | Svenningsen et al. |
| 6,664,340 B1 | 12/2003 | Kaerki et al. |
| 6,686,423 B1 | 2/2004 | Desbois et al. |
| 6,699,941 B1 | 3/2004 | Handlin et al. |
| 6,703,446 B2 | 3/2004 | Schwindeman et al. |

(Continued)

FOREIGN PATENT DOCUMENTS

CA    716645    8/1965

(Continued)

OTHER PUBLICATIONS

Coates, Geoffrey W.; Hustad, Phillip D. and Reinartz, Stefan, Catalysts for the Living Insertion Polymerization of Alkenes: Access to New Polyolefin Architectures Using Ziegler-Natta Chemistry, Agnew Chem. Int. Ed., 2002, 41, 2236-2257, Wiley-VCH, Verlag GmbH, 69451 Weinheim, Germany.
Zhang, Hao and Nomura, Kotohiro, Living Copolymerization of Ethylene with Styrene Catalyzed by (Cyclopentadienyl)(ketimide)titanium(IV) Complex-MAO Catalyst System, J. Am. Chem. Soc. 2005, 127, 9364-9365, Published on Web Jun. 10, 2005, JACS Communications.
A.S. Yeung and C.W. Frank, Polymer, 31, pp. 2089-2100, 2100-2111 (1990).
C.J. Hawker, A.W. Bosman and E. Harth, Chem. Rev., 101(12) 3661-3688 (2001).
U.S. Appl. No. 12/578,210, filed Oct. 13, 2009.

*Primary Examiner* — Ling Choi
*Assistant Examiner* — Mike M Dollinger
(74) *Attorney, Agent, or Firm* — Novak Druce & Quigg, LLP

(57) ABSTRACT

An Amine neutralized sulfonated block copolymer and a method for neutralizing a sulfonated block copolymer, the process including providing a solution comprising an organic solvent and the non-neutralized block copolymer in micellar form, and adding at least one amine to the solution.

27 Claims, No Drawings

U.S. PATENT DOCUMENTS

| | | |
|---|---|---|
| 6,716,777 B2 | 4/2004 | Lin |
| 6,767,976 B2 | 7/2004 | Hamada et al. |
| 6,777,082 B2 | 8/2004 | Patel et al. |
| 6,838,391 B2 | 1/2005 | Harle |
| 6,841,601 B2 | 1/2005 | Serpico et al. |
| 6,932,619 B2 | 8/2005 | Chen |
| 7,029,559 B2 | 4/2006 | Won et al. |
| 7,060,788 B2 | 6/2006 | Hucks et al. |
| 7,152,670 B2 | 12/2006 | Dobbs et al. |
| 7,160,551 B2 | 1/2007 | McHugh et al. |
| 7,188,666 B2 | 6/2007 | Yeon et al. |
| 7,228,891 B2 | 6/2007 | Shin et al. |
| 7,231,967 B2 | 6/2007 | Haglid |
| 7,307,127 B1 | 12/2007 | Napadensky et al. |
| 7,309,522 B2 | 12/2007 | Webb et al. |
| 7,312,292 B2 | 12/2007 | Ravikiran |
| 7,320,361 B2 | 1/2008 | Arai et al. |
| 7,323,265 B2 | 1/2008 | Fan et al. |
| 7,598,337 B2 | 10/2009 | Hung et al. |
| 7,601,785 B2 | 10/2009 | Chang et al. |
| 7,740,968 B2 | 6/2010 | Yamashita et al. |
| 7,754,844 B2 | 7/2010 | Sakaguchi et al. |
| 7,807,759 B2 | 10/2010 | Shin et al. |
| 7,851,575 B2 | 12/2010 | Ravikiran |
| 7,977,713 B2 | 7/2011 | Sankin et al. |
| 8,012,539 B2 | 9/2011 | Handlin et al. |
| 2001/0053475 A1 | 12/2001 | Ying et al. |
| 2003/0049511 A1 | 3/2003 | Ritts et al. |
| 2003/0106680 A1 | 6/2003 | Serpico et al. |
| 2003/0129469 A1 | 7/2003 | Sun et al. |
| 2003/0176582 A1 | 9/2003 | Bening et al. |
| 2003/0198858 A1 | 10/2003 | Sun et al. |
| 2003/0228681 A1 | 12/2003 | Serpico et al. |
| 2004/0005490 A1 | 1/2004 | Fan et al. |
| 2004/0029014 A1 | 2/2004 | Hwang et al. |
| 2004/0101753 A1 | 5/2004 | Hwang |
| 2004/0137813 A1 | 7/2004 | Faucher |
| 2004/0142910 A1 | 7/2004 | Vachon et al. |
| 2004/0234851 A1 | 11/2004 | Kim et al. |
| 2005/0061381 A1 | 3/2005 | Hosoi |
| 2005/0133204 A1 | 6/2005 | Serpico et al. |
| 2005/0266290 A1 | 12/2005 | Sun et al. |
| 2006/0154126 A1 | 7/2006 | Ritts et al. |
| 2007/0021569 A1 | 1/2007 | Willis et al. |
| 2008/0085437 A1 | 4/2008 | Dean et al. |
| 2008/0124563 A1 | 5/2008 | Shima |
| 2008/0305251 A1 | 12/2008 | Fukuta et al. |
| 2009/0123804 A1 | 5/2009 | Yamashita et al. |
| 2009/0126370 A1 | 5/2009 | Tsai |
| 2009/0246593 A1 | 10/2009 | Nowatari et al. |
| 2009/0263699 A1 | 10/2009 | Sadasue et al. |
| 2009/0314480 A1 | 12/2009 | Grinbergs et al. |
| 2010/0031817 A1 | 2/2010 | Ehrenberg et al. |
| 2010/0048817 A1 | 2/2010 | Dado et al. |
| 2010/0087783 A1 | 4/2010 | Weber et al. |
| 2010/0159353 A1 | 6/2010 | Ohgi et al. |
| 2010/0167100 A1 | 7/2010 | Moore et al. |
| 2010/0167159 A1 | 7/2010 | Ono et al. |
| 2010/0170776 A1 | 7/2010 | Ehrenberg et al. |
| 2010/0204403 A1 | 8/2010 | Willis et al. |
| 2010/0233569 A1 | 9/2010 | Ono et al. |
| 2010/0261799 A1 | 10/2010 | Vachon et al. |
| 2010/0264369 A1 | 10/2010 | Zhang |
| 2010/0273901 A1 | 10/2010 | Ehrenberg et al. |
| 2011/0230614 A1 | 9/2011 | Handlin et al. |
| 2011/0268901 A1 | 11/2011 | Handlin et al. |

FOREIGN PATENT DOCUMENTS

| | | | |
|---|---|---|---|
| CA | 2377553 A1 | 2/2001 |
| CA | 2616250 A1 | 1/2007 |
| DE | 3930217 A1 | 3/1991 |
| DE | 19728686 C1 | 4/1999 |
| FR | 2662604 A2 | 12/1991 |
| GB | 419604 A | 11/1934 |
| GB | 949126 A | 2/1956 |
| GB | 1019847 A | 10/1963 |
| GB | 1144167 A | 3/1969 |
| GB | 1336764 A | 11/1973 |
| GB | 1380411 A | 1/1975 |
| GB | 2066267 A | 7/1981 |
| GB | 2107325 A | 4/1983 |
| GB | 2168648 A | 6/1986 |
| GB | 2272220 A | 5/1994 |
| GB | 2399787 A | 9/2004 |
| GB | 2434762 A | 8/2007 |
| GB | 2444242 A | 6/2008 |
| JP | 53136082 A | 11/1978 |
| JP | 1256583 A | 10/1989 |
| JP | 1559652 C | 5/1990 |
| JP | 4053885 A | 2/1992 |
| JP | 5303918 A | 11/1993 |
| JP | 6000923 A | 1/1994 |
| JP | 7018237 A | 1/1995 |
| JP | 1910228 C | 3/1995 |
| JP | 1914163 C | 3/1995 |
| JP | 7060907 A | 3/1995 |
| JP | 7082428 A | 3/1995 |
| JP | 1926012 C | 4/1995 |
| JP | 2549576 B2 | 10/1996 |
| JP | 9074273 A | 3/1997 |
| JP | 9078431 A | 3/1997 |
| JP | 9094925 A | 4/1997 |
| JP | 9156009 A | 6/1997 |
| JP | 9217046 A | 8/1997 |
| JP | 9235524 A | 9/1997 |
| JP | 9277478 A | 10/1997 |
| JP | 10061057 A | 3/1998 |
| JP | 10110150 A | 4/1998 |
| JP | 10158454 A | 6/1998 |
| JP | 10298514 A | 11/1998 |
| JP | 2837435 B2 | 12/1998 |
| JP | 2843947 B2 | 1/1999 |
| JP | 2868391 B2 | 3/1999 |
| JP | 3704906 B2 | 3/1999 |
| JP | 11080681 A | 3/1999 |
| JP | 11158299 A | 6/1999 |
| JP | 11199839 A | 7/1999 |
| JP | 2000033671 A | 2/2000 |
| JP | 2000038550 A | 2/2000 |
| JP | 2000136367 A | 5/2000 |
| JP | 2000318102 A | 11/2000 |
| JP | 2000345120 A | 12/2000 |
| JP | 2001020169 A | 1/2001 |
| JP | 2001062968 A | 3/2001 |
| JP | 3164554 B2 | 5/2001 |
| JP | 3249005 B2 | 1/2002 |
| JP | 2002338918 A | 1/2002 |
| JP | 2004050612 A | 2/2002 |
| JP | 2002105424 A | 4/2002 |
| JP | 3326195 B2 | 9/2002 |
| JP | 3338179 B2 | 10/2002 |
| JP | 3355391 B2 | 12/2002 |
| JP | 3370198 B2 | 1/2003 |
| JP | 3411068 B2 | 5/2003 |
| JP | 3484840 B2 | 1/2004 |
| JP | 3515740 B2 | 4/2004 |
| JP | 2004121828 A | 4/2004 |
| JP | 2004136480 A | 5/2004 |
| JP | 3660771 B2 | 6/2005 |
| JP | 2006021959 A | 1/2006 |
| JP | 3787935 B2 | 6/2006 |
| JP | 2007001086 A | 1/2007 |
| JP | 3887341 B2 | 2/2007 |
| JP | 2007105134 A | 4/2007 |
| JP | 2007126512 A | 5/2007 |
| JP | 3940952 B2 | 7/2007 |
| JP | 3967842 B2 | 8/2007 |
| JP | 2007238746 A | 9/2007 |
| JP | 2008073888 A | 4/2008 |
| JP | 2008127447 A | 6/2008 |
| JP | 2009143998 A | 7/2009 |
| JP | 4327040 B2 | 9/2009 |
| JP | 4414016 B2 | 2/2010 |
| JP | 2010085585 A | 4/2010 |
| JP | 2010106090 A | 5/2010 |
| JP | 4544563 B2 | 9/2010 |

| | | | |
|---|---|---|---|
| KR | 20020076825 A | 10/2002 | |
| KR | 20040013555 A | 2/2004 | |
| WO | 9821773 A1 | 5/1998 | |
| WO | 0109239 A1 | 2/2001 | |
| WO | 0272242 A1 | 1/2002 | |
| WO | 03050896 A3 | 10/2003 | |
| WO | 03050897 A3 | 10/2003 | |
| WO | 2004004688 A1 | 1/2004 | |
| WO | 2004032306 A3 | 7/2004 | |
| WO | 2004070312 A1 | 8/2004 | |
| WO | 2004051172 A1 | 3/2005 | |
| WO | 2007010039 A1 | 1/2007 | |
| WO | 2007010042 A1 | 1/2007 | |
| WO | 2008030939 A3 | 7/2008 | |
| WO | WO 2008089332 A2 * | 7/2008 | |
| WO | 2011065460 A1 | 6/2011 | |

* cited by examiner

AMINE NEUTRALIZED SULFONATED BLOCK COPOLYMERS AND METHOD FOR MAKING SAME

FIELD OF THE INVENTION

The present disclosure relates to amine neutralized sulfonated block copolymers and methods for preparing neutralized sulfonated block copolymers. In particular, the present disclosure relates to sulfonated block copolymers having at least one interior block having at least two polymer end blocks that contain little sulfonic acid or sulfonate functionality and at least one polymer interior block which contains an effective amount of sulfonic acid or sulfonate functionality wherein the sulfonic acid or sulfonate ester groups have been neutralized by an amine. The present disclosure further relates to various end use applications of the neutralized sulfonated block copolymers.

BACKGROUND OF THE INVENTION

The preparation of styrenic block copolymers is well known in the art. Generally, styrenic block copolymers ("SBC") can comprise internal polymer blocks and terminal end polymer blocks comprising chemically different monomer types thereby providing particular desirable properties. As an example, in a more common form, SBC's may have internal blocks of conjugated diene and external blocks having aromatic alkenyl arenes. The interaction of the differing properties of the polymer blocks allow for different polymer characteristics to be obtained. For example, the elastomer properties of internal conjugated diene blocks along with the "harder" aromatic alkenyl arenes external blocks together form polymers which are useful for an enormous variety of applications. Such SBC's can be prepared through sequential polymerization and/or through coupling reactions.

It is known also that SBC's can be functionalized in order to further modify their characteristics. An example of this is the addition of sulfonic acid or sulfonate functional groups to the polymer backbone. One of the first such sulfonated block copolymers is disclosed, for example, in U.S. Pat. No. 3,577,357 to Winkler. The resulting block copolymer was characterized as having the general configuration A-B-(B-A)$_{1-5}$, wherein each A is a non-elastomeric sulfonated monovinyl arene polymer block and each B is a substantially saturated elastomeric alpha-olefin polymer block, said block copolymer being sulfonated to an extent sufficient to provide at least 1% by weight of sulfur in the total polymer and up to one sulfonated constituent for each monovinyl arene unit. The sulfonated polymers could be used as such, or could be used in the form of their acid, alkali metal salt, ammonium salt or amine salt. According to Winkler, a polystyrene-hydrogenated polyisoprene-polystyrene triblock copolymer was treated with a sulfonating agent comprising sulfur trioxide/triethyl phosphate in 1,2-dichloroethane. The products are described as having water absorption characteristics that might be useful in water purification membranes and the like.

More recently, US 2007/0021569 to Willis et al. disclosed the preparation of sulfonated polymer and inter alia illustrated a sulfonated block copolymer that is solid in water comprising at least two polymer end blocks and at least one saturated polymer interior block wherein each end block is a polymer block resistant to sulfonation and each interior block is a saturated polymer block susceptible to sulfonation, and wherein the interior blocks are sulfonated to the extent of 10 to 100 mol percent. The sulfonated block copolymers are described as having a high water vapor transport rate while at the same time having good dimensional stability and strength in the presence of water, and as being therefore valuable for many end use applications, especially where the combination of good wet strength, good water and proton transport characteristics, good methanol resistance, easy film or membrane formation, barrier properties, control of flexibility and elasticity, adjustable hardness, and thermal/oxidative stability are important.

Additionally, WO 2008/089332 to Dado et al. discloses a process for preparing sulfonated block copolymers illustrating, e.g., a process which involves providing a precursor block copolymer having at least one end block A and at least one interior block B wherein each A block is a polymer block resistant to sulfonation and each B block is a polymer block susceptible to sulfonation wherein said A and B blocks are substantially free of olefinic unsaturation; and reacting the precursor block copolymer with an acyl sulfate in a reaction mixture further comprising at least one non-halogenated aliphatic solvent to form a sulfonated block polymer. The product obtained in the process is described as comprising sulfonated polymer micelles and/or other polymer aggregates of definable size and distribution, as would be characteristic of polymer micelle structures.

It has also been reported that sulfonated polymers may be neutralized with a variety of compounds. U.S. Pat. No. 5,239,010 to Pottick et al. and U.S. Pat. No. 5,516,831 to Balas et al., for example, indicate that styrene blocks with sulfonic acid functional groups may be neutralized by reacting the sulfonated block polymer with an ionizable metal compound to obtain a metal salt.

Additionally, US 2007/0021569 to Willis et al. indicated the at least partial neutralization of the sulfonated block copolymer with a variety of base materials including, for example, ionizable metal compounds as well as various amines. It was further proposed that the sulfonated block copolymer may be modified by hydrogen bonding interaction with a base material which, while not sufficiently strong to neutralize the acid centers of the sulfonated block copolymer, is strong enough to achieve a significant attraction to the block copolymer via a hydrogen bonding interaction.

SUMMARY OF THE INVENTION

In some embodiments, a process for neutralizing a sulfonated block copolymer having at least one end block A and at least one interior block B wherein each A block contains essentially no sulfonic acid or sulfonate functional groups and each B block is a polymer block containing from about 10 to about 100 mol percent sulfonic acid or sulfonate functional groups based on the number of monomer units of the B block and which are not neutralized includes
    providing a solution comprising an organic solvent and the non-neutralized block copolymer in micellar form, and
    adding at least one amine to the solution.

In further aspects, from 80% of the sulfonic acid or sulfonate functional groups are neutralized. In additional embodiments the amine is added in an amount of from about 0.8 to about 10 equivalents of amine base per 1 equivalent of sulfonic acid or sulfonate functional group of the non-neutralized block copolymer. Additionally, in other aspects, the organic solvent is a non-halogenated aliphatic solvent.

In some embodiments, the organic solvent may comprise at least a first and a second aliphatic solvent, and wherein the B block is substantially soluble in the first solvent and the A block is substantially soluble in the second solvent.

Additionally, the amine may be selected from the group consisting of multifunctional amines, monofunctional amines, and mixtures thereof, the amine groups in each case being primary, secondary or tertiary amine groups having one, two or three aliphatic and/or aromatic substituents, and wherein substituents of the primary, secondary and tertiary amine groups may be linear, branched, or cyclic aliphatic or aromatic moieties or mixtures of such substituents.

In further embodiments, the amine is a multi-functional amine having from two to four nitrogen functionalities In alternative embodiments, there is disclosed herein a neutralized sulfonated block copolymer which is solid in water comprising at least two polymer end blocks A and at least one polymer interior block B, wherein each A block contains essentially no sulfonic acid or sulfonate functional groups and each B block is a polymer block containing from about 10 to about 100 mol percent sulfonic acid or sulfonate functional groups based on the number of monomer units of the B block;

the sulfonated B blocks are neutralized with a multi-functional amine having from two to four nitrogen functionalities, wherein from 95% to 100% of the sulfonic acid or sulfonate functional groups in the B block are neutralized.

In further embodiments, the multi-functional amine has 2 or 3 nitrogen functionalities. Additionally, the multi-functional amine may comprise at least two nitrogen functionalities which are linked to one another via a $C_2$-$C_4$ linear, branched, or cyclic aliphatic bridging moiety.

In some embodiments, the multifunctional amine has the formula:

$$R^1\text{—NH-A-NR}^2\text{—}R^3$$

wherein

A is a straight chain or branched alkylene moiety having from two to six carbon atoms;

$R^1$ is hydrogen or $C_1$-$C_6$-alkyl $R^2$ is hydrogen or $C_1$-$C_6$-alkyl $R^3$ is $C_1$-$C_6$-alkyl;

or $R^2$ and $R^3$ together with the nitrogen to which they are bonded form a 5 to 7 membered ring made up of 4 to 6 carbon atoms and optionally one or two additional nitrogen ring members wherein the additional nitrogen ring members are independently of one another substituted by hydrogen, $C_1$-$C_6$-alkyl or amino-substituted $C_2$-$C_6$-alkyl.

In still further embodiments, the multi functional amine is selected from the group consisting of N,N-dimethylethylenediamine, N,N'-dimethylethylennediamine, and 1,4-bis(3-aminopropyl)piperzaine, or mixture thereof.

In further embodiments, the block copolymer meets one or both of the following provisions:

the neutralized block copolymer has a water uptake value which is equal to or less than the water uptake value of a corresponding, non-neutralized sulfonated block copolymer; and/or the neutralized block copolymer has a dry tensile modulus which is equal to or less than the dry tensile modulus of the corresponding, non-neutralized sulfonated block copolymer, the modulus measured according to ASTM D412.

In further embodiments, the neutralized block copolymer is in hydrated form. In still further embodiments, the hydrated, neutralized block copolymer meets both of the following provisions:

a. the hydrated, neutralized block copolymer has a water transport rate of at least about 50% of the water transport rate of a hydrated form of a corresponding, non-neutralized sulfonated block copolymer;

b. the hydrated, neutralized block copolymer a water uptake value of less than 80% the water uptake value of a corresponding, non-neutralized sulfonated block copolymer.

In additional embodiments, each A block may comprise one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof.

Each B block may comprise segments of one or more vinyl aromatic monomers selected from polymerized (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene and (vii) mixtures thereof.

Each D block may be selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

In further embodiments, the sulfonated block copolymer may have the general configuration A-B-A, A-B-A-B-A, $(A-B-A)_nX$, $(A-B)_nX$, A-D-B-D-A, A-B-D-B-A, $(A-D-B)_nX$, $(A-B-D)_nX$ or mixtures thereof, where n is an integer from 2 to about 30, and X is a coupling agent residue and wherein each D block is a polymer block resistant to sulfonation and the plurality of A blocks, B blocks, or D blocks are the same or different.

DETAILED DESCRIPTION OF THE INVENTION

A detailed description of embodiments of the present invention is disclosed herein; however, it is to be understood that the disclosed embodiments are merely exemplary of the invention, and that the invention may be embodied in various and alternative forms of the disclosed embodiments. Therefore, specific structural and functional details which are addressed in the embodiments disclosed herein are not to be interpreted as limiting, but merely as a basis for the claims and as a representative basis for teaching one skilled in the art to variously employ the present invention.

Unless specifically stated otherwise, all technical terms used herein have the meaning as commonly understood by those skilled in the art.

Moreover, unless specifically stated otherwise, the following expressions as used herein are understood to have the following meanings.

The expressions "non-neutralized sulfonated block copolymer" and "precursor sulfonated block copolymer" as used herein refers to a sulfonated block copolymer that essentially has not been neutralized by an amine, metal or other polar compound and contains sulfonic acid and/or sulfonate ester functionality.

The expression "neutralized block copolymer" as used herein refers to a sulfonated block copolymer which has been neutralized at least partially.

The expression "engineering thermoplastic resin" as used herein encompasses the various polymers such as for example thermoplastic polyester, thermoplastic polyurethane, poly (aryl ether) and poly(aryl sulfone), polycarbonate, acetal resin, polyamide, halogenated thermoplastic, nitrile barrier resin, poly(methyl methacrylate) and cyclic olefin copolymers, and further defined in U.S. Pat. No. 4,107,131, the disclosure of which is hereby incorporated by reference.

The expression "equilibrium" as used herein in the context of water absorption refers to the state in which the rate of water absorption by a block copolymer is in balance with the rate of water loss by the block copolymer. The state of equilibrium can generally be reached by immersing a sulfonated block copolymer or a neutralized block copolymer in water for a 24 hour period (one day). The equilibrium state may be reached also in other wet environments, however the period of time to reach equilibrium may differ.

The expression "hydrated" block copolymer as used herein refers to a block copolymer which has absorbed a significant amount of water.

The expression "wet state" as used herein refers to the state at which a block copolymer has reached equilibrium or has been immersed in water for a period of 24 hours.

The expression "dry state" as used herein refers to the state of a block copolymer which has absorbed essentially no or only insignificant amounts of water. For example, a sulfonated or neutralized block copolymer which is merely in contact with the atmosphere will generally remain in the dry state.

All publications, patent applications, and patents mentioned herein are incorporated by reference in their entirety. In the event of conflict, the present specification, including definitions, is intended to control.

With respect to all ranges disclosed herein, such ranges are intended to include any combination of the mentioned upper and lower limits even if the particular combination is not specifically listed.

According to several embodiments of the present disclosure, it has been surprisingly found that neutralized sulfonated polymers may be obtained by directly contacting a micellar solution of sulfonated block copolymer with an amine. By this process, a broad variety of amines may be employed for neutralizing a sulfonated block copolymer and the subsequent formation of membranes and articles from this neutralized block copolymer. Furthermore, the process according to several embodiments allows for an intimate contact of the amine neutralizing agent and for the formation of membranes having an unexpectedly superior balance of properties. These properties include, but are not limited to:

(1) An exceptionally high water vapor transport rate;
(2) Dimensional stability under wet conditions, as evidenced by low water uptake values and low swelling;
(3) A reduced dry tensile modulus as compared to that of the corresponding non-neutralized sulfonated block copolymer.
(4) Consistent tensile strengths in both wet and dry states.

Accordingly, the amine neutralized sulfonated block copolymers presented herein are broadly suited for a wide variety of end uses, and are especially useful for applications involving water or which take place in wet environments.

In some embodiments, the precursor sulfonated block copolymers which may be neutralized according to embodiments of the present disclosure include the non-neutralized sulfonated block copolymers as described in US 2007/0021569 to Willis et al., the description of which is incorporated herein by reference in its entirety. Furthermore, the precursor sulfonated block copolymers which include the non-neutralized sulfonated block copolymers as described in US 2007/0021569 may be prepared according to the process of WO 2008/089332 to Dado et al. which is hereby incorporated by reference in its entirety.

The block copolymers needed to prepare the non-neutralized sulfonated block copolymers of the present invention may be made by a number of different processes, including anionic polymerization, moderated anionic polymerization, cationic polymerization, Ziegler-Natta polymerization, and living chain or stable free radical polymerization. Anionic polymerization is described below in more detail, and in the patents referenced. Moderated anionic polymerization processes for making styrenic block copolymers are described, for example, in U.S. Pat. No. 6,391,981, U.S. Pat. No. 6,455,651 and U.S. Pat. No. 6,492,469, each of which is incorporated herein by reference. Cationic polymerization processes for preparing block copolymers are disclosed, for example, in U.S. Pat. No. 6,515,083 and U.S. Pat. No. 4,946,899, each of which is incorporated herein by reference.

Living Ziegler-Natta polymerization processes that may be used to make block copolymers were recently reviewed by G. W. Coates, P. D. Hustad, and S. Reinartz in Angew. Chem. Int. Ed., 41, 2236-2257 (2002); a subsequent publication by H. Zhang and K. Nomura (J. Am. Chem. Soc. Commun., 2005) describes the use of living Ziegler-Natta techniques for making styrenic block copolymers specifically. The extensive work in the field of nitroxide mediated living radical polymerization chemistry has been reviewed; see C. J. Hawker, A. W. Bosman, and E. Harth, Chem. Rev., 101(12), 3661-3688 (2001). As outlined in this review, styrenic block copolymers were synthesized using living or stable free radical techniques. For the polymers of the present invention, nitroxide mediated polymerization methods will be the preferred living chain or stable free radical polymerization process.

1. Polymer Structure

One aspect of the sulfonated block copolymers described herein relates to the polymer structure of the neutralized sulfonated block copolymers. In one embodiment, the neutralized block copolymers will have at least two polymer end or outer blocks A and at least one saturated polymer interior block B wherein each A block is a polymer block resistant to sulfonation and each B block is a polymer block susceptible to sulfonation.

Preferred structures have the general configuration A-B-A, $(A-B)_n(A)$, $(A-B-A)_n$, $(A-B-A)_nX$, $(A-B)_nX$, A-B-D-B-A, A-D-B-D-A, $(A-D-B)_n(A)$, $(A-B-D)_n(A)$, $(A-B-D)_nX$, $(A-D-B)_nX$ or mixtures thereof, where n is an integer from 2 to about 30, X is coupling agent residue and A, B and D are as defined hereinbelow.

Most preferred structures are linear structures such as A-B-A, $(A-B)_2X$, A-B-D-B-A, $(A-B-D)_2X$, A-D-B-D-A, and $(A-D-B)_2X$, and radial structures such as $(A-B)_nX$ and $(A-D-B)_nX$ where n is 3 to 6. Such block copolymers are typically made via anionic polymerization, stable free radical polymerization, cationic polymerization or Ziegler-Natta polymerization. Preferably, the block copolymers are made via anionic polymerization. It will be understood by those skilled in the art that in any polymerization, the polymer mixture will include a certain amount of A-B diblock copolymer, in addition to any linear and/or radial polymers. The respective amounts have not been found to be detrimental to the practice of the invention.

The A blocks are one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. If the A segments are polymers of 1,3-cyclodiene or conjugated dienes, the segments will be hydrogenated subsequent to polymerization of the block copolymer and before sulfonation of the block copolymer.

The para-substituted styrene monomers are selected from para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene and mixtures of the above monomers. Preferred para-substituted styrene monomers are para-t-butylstyrene and para-methylstyrene, with para-t-butylstyrene being most preferred. Monomers may be mixtures of monomers, depending on the particular source. It is desired that the overall purity of the para-substituted styrene monomers be at least 90%-wt., preferably at least 95%-wt., and even more preferably at least 98%-wt. of the desired para-substituted styrene monomer.

When the A blocks are polymers of ethylene, it may be useful to polymerize ethylene via a Ziegler-Natta process, as taught in the references in the review article by G. W. Coates et. al, as cited above, which disclosure is herein incorporated by reference. It is preferred to make the ethylene blocks using anionic polymerization techniques as taught in U.S. Pat. No. 3,450,795, which disclosure is herein incorporated by reference. The block molecular weight for such ethylene blocks typically is between about 1,000 and 60,000.

When the A blocks are polymers of alpha olefins of 3 to 18 carbon atoms, such polymers are prepared by via a Ziegler-Natta process, as taught in the references in the review article by G. W. Coates et. al, as cited above, which disclosure is herein incorporated by reference. Preferably, the alpha olefins are propylene, butylene, hexane or octene, with propylene being most preferred. The block molecular weight for such alpha olefin blocks typically is between about 1,000 and about 60,000.

When the A blocks are hydrogenated polymers of 1,3-cyclodiene monomers, such monomers are selected from the group consisting of 1,3-cyclohexadiene, 1,3-cycloheptadiene and 1,3-cyclooctadiene. Preferably, the cyclodiene monomer is 1,3-cyclohexadiene. Polymerization of such cyclodiene monomers is disclosed in U.S. Pat. No. 6,699,941, which disclosure is herein incorporated by reference. It will be necessary to hydrogenate the A blocks when using cyclodiene monomers since non-hydrogenated polymerized cyclodiene blocks are susceptible to sulfonation. Accordingly, after synthesis of the A block with 1,3-cyclodiene monomers, the block copolymer will be hydrogenated.

When the A blocks are hydrogenated polymers of conjugated acyclic dienes having a vinyl content less than 35 mol percent prior to hydrogenation, it is preferred that the conjugated diene is 1,3-butadiene. It is necessary that the vinyl content of the polymer prior to hydrogenation be less than 35 mol percent, preferably less than 30 mol percent. In certain embodiments, the vinyl content of the polymer prior to hydrogenation will be less than 25 mol percent, even more preferably less than 20 mol percent, and even less than 15 mol percent with one of the more advantageous vinyl contents of the polymer prior to hydrogenation being less than 10 mol percent. In this way, the A blocks will have a crystalline structure, similar to that of polyethylene. Such A block structures are disclosed in U.S. Pat. No. 3,670,054 and in U.S. Pat. No. 4,107,236, each of which disclosure is herein incorporated by reference.

The A blocks may also be polymers of acrylic esters or methacrylic esters. Such polymer blocks may be made according to the methods disclosed in U.S. Pat. No. 6,767,976, which disclosure is herein incorporated by reference. Specific examples of the methacrylic ester include esters of a primary alcohol and methacrylic acid, such as methyl methacrylate, ethyl methacrylate, propyl methacrylate, n-butyl methacrylate, isobutyl methacrylate, hexyl methacrylate, 2-ethylhexyl methacrylate, dodecyl methacrylate, lauryl methacrylate, methoxyethyl methacrylate, dimethylaminoethyl methacrylate, diethylaminoethyl methacrylate, glycidyl methacrylate, trimethoxysilylpropyl methacrylate, trifluoromethyl methacrylate, trifluoroethyl methacrylate; esters of a secondary alcohol and methacrylic acid, such as isopropyl methacrylate, cyclohexyl methacrylate and isobornyl methacrylate; and esters of a tertiary alcohol and methacrylic acid, such as tert-butyl methacrylate. Specific examples of the acrylic ester include esters of a primary alcohol and acrylic acid, such as methyl acrylate, ethyl acrylate, propyl acrylate, n-butyl acrylate, isobutyl acrylate, hexyl acrylate, 2-ethylhexyl acrylate, dodecyl acrylate, lauryl acrylate, methoxyethyl acrylate, dimethylaminoethyl acrylate, diethylaminoethyl acrylate, glycidyl acrylate, trimethoxysilylpropyl acrylate, trifluoromethyl acrylate, trifluoroethyl acrylate; esters of a secondary alcohol and acrylic acid, such as isopropyl acrylate, cyclohexyl acrylate and isobornyl acrylate; and esters of a tertiary alcohol and acrylic acid, such as tert-butyl acrylate. If necessary, as raw material or raw materials, one or more of other anionic polymerizable monomers may be used together with the (meth)acrylic ester in the present invention. Examples of the anionic polymerizable monomer that can be optionally used include methacrylic or acrylic monomers such as trimethylsilyl methacrylate, N,N-dimethylmethacrylamide, N,N-diisopropylmethacrylamide, N,N-diethylmethacrylamide, N,N-methylethylmethacrylamide, N,N-di-tert-butylmethacrylamide, trimethylsilyl acrylate, N,N, dimethylacrylamide N,N-diisopropylacrylamide, N,N-methylethylacrylamide and N,N-di-tert-butylacrylamide. Moreover, there may be used a multifunctional anionic polymerizable monomer having in the molecule thereof two or more methacrylic or acrylic structures, such as methacrylic ester structures or acrylic ester structures (for example, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, trimethylolpropane triacrylate and trimethylolpropane trimethacrylate).

In the polymerization processes used to make the acrylic or methacrylic ester polymer blocks, only one of the monomers, for example, the (meth)acrylic ester may be used, or two or more thereof may be used in combination. When two or more of the monomers are used in combination, any copolymerization form selected from random, block, tapered block and the like copolymerization forms may be effected by selecting conditions such as a combination of the monomers and the timing of adding the monomers to the polymerization system (for example, simultaneous addition of two or more monomers, or separate additions at intervals of a given time).

The A blocks may also contain up to 15 mol percent of the vinyl aromatic monomers mentioned for the B blocks. In some embodiments, the A blocks may contain up to 10 mol percent, preferably they will contain only up to 5 mol percent, and particularly preferably only up to 2 mol percent of the vinyl aromatic monomers mentioned in the B blocks. However, in the most preferred embodiments, the A blocks will contain no vinyl monomers mentioned in the B blocks. Accordingly, the sulfonation level in the A blocks may be from 0 up to 15 mol percent of the total monomers in the A block. It will be understood by those skilled in the art that suitable ranges include any combination of the specified mol percents even if the specific combination and range is not listed herewith.

Each B block comprises segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenylethylene monomer, and mixtures thereof. In addition to the monomers and polymers noted immediately before, the B blocks may also comprise a hydrogenated copolymer of such monomer (s) with a conjugated diene selected from 1,3-butadiene, isoprene and mixtures thereof, having a vinyl content of between 20 and 80 mol percent. These copolymers with hydrogenated dienes may be random copolymers, tapered copolymers, block copolymers or controlled distribution copolymers. In one preferred embodiment. the B blocks are hydrogenated and comprise a copolymer of conjugated dienes and the vinyl aromatic monomers noted in this paragraph. In another preferred embodiment, the B blocks are unsubstituted styrene monomer blocks which are saturated by virtue of the nature of the monomer and do not require the added process step of hydrogenation. The B blocks having a controlled distribution structure are disclosed in US 2003/0176582, which disclosure is herein incorporated by reference. US 2003/0176582 also discloses the preparation of sulfonated block copolymers, albeit not the block copolymer structures claimed in the present invention. The B blocks comprising a styrene block are described herein. In one preferred embodiment, the saturated B blocks are unsubstituted styrene blocks, since the polymer will not then require a separate hydrogenation step.

In another aspect of the present invention, the block copolymer includes at least one impact modifier block D having a glass transition temperature less than 20° C. In one embodiment, the impact modifier block D comprises a hydrogenated polymer or copolymer of a conjugated diene selected from isoprene, 1,3-butadiene and mixtures thereof having a vinyl content prior to hydrogenation of between 20 and 80 mol percent and a number average molecular weight of between 1,000 and 50,000. In another embodiment, the impact modifier block D comprises an acrylate or silicone polymer having a number average molecular weight of 1,000 to 50,000. In still another embodiment, the D block is a polymer block of isobutylene having a number average molecular weight of 1,000 to 50,000.

Each A block independently has a number average molecular weight between about 1,000 and about 60,000 and each B block independently has a number average molecular weight between about 10,000 and about 300,000. Preferably each A block has a number average molecular weight of between 2,000 and 50,000, more preferably between 3,000 and 40,000 and even more preferably between 3,000 and 30,000. Preferably each B block has a number average molecular weight of between 15,000 and 250,000, more preferably between 20,000 and 200,000, and even more preferably between 30,000 and 100,000. It will be understood by those skilled in the art that suitable ranges include any combination of the specified number average molecular weights even if the specific combination and range is not listed herewith. These molecular weights are most accurately determined by light scattering measurements, and are expressed as number average molecular weight. Preferably, the sulfonated polymers have from about 8 mol percent to about 80 mol percent, preferably from about 10 to about 60 mol percent A blocks, more preferably more than 15 mol percent A blocks and even more preferably from about 20 to about 50 mol percent A blocks.

The relative amount of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in the sulfonated block copolymer is from about 5 to about 90 mol percent, preferably from about 5 to about 85 mol percent. In alternative embodiments, the amount is from about 10 to about 80 mol percent, preferably from about 10 to about 75 mol percent, more preferably from about 15 to about 75 mol percent, with the most preferred being from about 25 to about 70 mol percent. It will be understood by those skilled in the art that the ranges include any combination of the specified mol percents even if the specific combination and range is not listed herewith.

As for the saturated B block, in one preferred embodiment the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block is from about 10 to about 100 mol percent, preferably from about 25 to about 100 mol percent, more preferably from about 50 to about 100 mol percent, even more preferably from about 75 to about 100 mol percent and most preferably 100 mol percent. It will be understood by those skilled in the art that suitable ranges include any combination of the specified mol percents even if the specific combination and range is not listed herewith.

Typical levels of sulfonation are where each B block contains one or more sulfonic functional groups. Preferred levels of sulfonation are 10 to 100 mol percent based on the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block, more preferably about 20 to 95 mol percent and even more preferably about 30 to 90 mol percent. It will be understood by those skilled in the art that suitable ranges of sulfonation include any combination of the specified mol percents even if the specific combination and range is not listed herewith. The level of sulfonation is determined by titration of a dry polymer sample, which has been redissolved in tetrahydrofuran with a standardized solution of NaOH in a mixed alcohol and water solvent.

2. Overall Anionic Process to Prepare Polymers

The anionic polymerization process comprises polymerizing the suitable monomers in solution with a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms make particularly suitable solvents. Frequently used are cyclic alkanes, such as cyclopentane, cyclohexane, cycloheptane, and cyclooctane, all of which are relatively non-polar. Other suitable solvents will be known to those skilled in the art and can be selected to perform effectively in a given set of process conditions, with polymerization temperature being one of the major factors taken into consideration.

Starting materials for preparing the block copolymers of the present invention include the initial monomers noted above. Other important starting materials for anionic co-polymerizations include one or more polymerization initiators. In the present invention such include, for example, alkyl lithium compounds such as s-butyllithium, n-butyllithium, t-butyllithium, amyllithium and the like and other organo lithium compounds including di-initiators such as the di-sec-butyl lithium adduct of m-diisopropenyl benzene. Other such di-initiators are disclosed in U.S. Pat. No. 6,492,469, which is incorporated herein by reference. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 and Re. 27,145, each of which disclosures is incorporated herein by reference.

Polymerization conditions to prepare the block copolymers of the present invention are typically similar to those used for anionic polymerizations in general. In the present invention polymerization is preferably carried out at a temperature of from about −30° C. to about 150° C., more preferably about 10° C. to about 100° C., and most preferably, in view of industrial limitations, from about 30° C. to about 90° C. The polymerization is carried out in an inert atmosphere, preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, and the molecular weight of the polymer that is desired. When two or more of the monomers are used in combination, any copolymerization form selected from random, block, tapered block, controlled distribution block, and the like copolymerization forms may be utilized.

It will be understood by those skilled in the art that the anionic polymerization process may be moderated by the addition of a Lewis acid, such as an aluminum alkyl, a magnesium alkyl, a zinc alkyl or combinations thereof. The effects of the added Lewis acid on the polymerization process are 1) to lower the viscosity of the living polymer solution allowing for a process that operates at higher polymer concentrations and thus uses less solvent,
2) to enhance the thermal stability of the living polymer chain end which permits polymerization at higher temperatures and again, reduces the viscosity of the polymer solution allowing for the use of less solvent, and
3) to slow the rate of reaction which permits polymerization at higher temperatures while using the same technology for removing the heat of reaction as had been used in the standard anionic polymerization process.

The processing benefits of using Lewis acids to moderate anionic polymerization techniques have been disclosed in U.S. Pat. No. 6,391,981, U.S. Pat. No. 6,455,651 and U.S. Pat. No. 6,492,469, which are herein incorporated by reference. Related information is disclosed in U.S. Pat. No. 6,444,767 and U.S. Pat. No. 6,686,423, each of which disclosures is incorporated herein by reference. The polymer made by such a moderated, anionic polymerization process can have the same structure as one prepared using the conventional anionic polymerization process and as such, this process can be useful in making the polymers of the present invention. For Lewis acid moderated, anionic polymerization processes, reaction temperatures between 100° C. and 150° C. are preferred as at these temperatures it is possible to take advantage of conducting the reaction at very high polymer concentrations. While a stoichiometric excess of the Lewis acid may be used, in most instances there is not sufficient benefit in improved processing to justify the additional cost of the excess Lewis acid. It is preferred to use from about 0.1 to about 1 mole of Lewis acid per mole of living, anionic chain ends to achieve an improvement in process performance with the moderated, anionic polymerization technique.

Preparation of Radial (Branched) Polymers Requires a Post-Polymerization Step called "coupling". In the above radial formulas n is an integer of from 3 to about 30, preferably from about 3 to about 15, and more preferably from 3 to 6, and X is the remnant or residue of a coupling agent. A variety of coupling agents are known in the art and can be used in preparing the coupled block copolymers of the present invention. These include, for example, dihaloalkanes, silicon halides, siloxanes, multifunctional epoxides, silica compounds, esters of monohydric alcohols with carboxylic acids, (e.g. methylbenzoate and dimethyl adipate) and epoxidized oils. Star-shaped polymers are prepared with polyalkenyl coupling agents as disclosed in, for example, U.S. Pat. No. 3,985,830, U.S. Pat. No. 4,391,949 and U.S. Pat. No. 4,444,953; as well as CA 716,645, each of which disclosures is incorporated herein by reference. Suitable polyalkenyl coupling agents include divinylbenzene, and preferably m-divinylbenzene. Preferred are tetra-alkoxysilanes such as tetramethoxysilane (TMOS) and tetra-ethoxysilane (TEOS), tri-alkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Linear polymers may also be prepared by a post-polymerization "coupling" step. However, unlike radial polymers, "n" in the above formulas is the integer 2, and is the remnant or residue of a coupling agent.

3. Process to Prepare Hydrogenated Block Copolymers

As noted, in some cases—i.e., (1) when there is a diene in the B interior blocks, (2) when the A block is a polymer of a 1,3-cyclodiene, (3) when there is an impact modifier block D and (4) when the A block is a polymer of a conjugated diene having a vinyl content of less than 35 mol percent—it is necessary to selectively hydrogenate the block copolymer to remove any ethylenic unsaturation prior to sulfonation. Hydrogenation generally improves thermal stability, ultraviolet light stability, oxidative stability, and, therefore, weatherability of the final polymer, and reduces of the risk of sulfonating the A block or the D block.

Hydrogenation can be carried out via any of the several hydrogenation or selective hydrogenation processes known in the prior art. Such hydrogenation has been accomplished using methods such as those taught in, for example, U.S. Pat. No. 3,595,942, U.S. Pat. No. 3,634,549, U.S. Pat. No. 3,670,054, U.S. Pat. No. 3,700,633, and Re. 27,145, the disclosures of which are incorporated herein by reference. These methods operate to hydrogenate polymers containing ethylenic unsaturation and are based upon operation of a suitable catalyst. Such catalyst, or catalyst precursor, preferably comprises a Group 8 to 10 metal such as nickel or cobalt which is combined with a suitable reducing agent such as an aluminum alkyl or hydride of a metal selected from Groups 1, 2, and 13 of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90 percent of the conjugated diene double bonds are reduced, and between zero and 10 percent of the arene double bonds are reduced. Preferred ranges are at least about 95 percent of the conjugated diene double bonds reduced, and more preferably about 98 percent of the conjugated diene double bonds are reduced.

Once the hydrogenation is complete, it is preferable to oxidize and extract the catalyst by stirring the polymer solution with a relatively large amount of aqueous acid (preferably 1 to 30 percent by weight acid), at a volume ratio of about 0.5 parts aqueous acid to 1 part polymer solution. The nature of the acid is not critical. Suitable acids include phosphoric acid, sulfuric acid and organic acids. This stirring is continued at about 50° C. for from about 30 to about 60 minutes while sparging with a mixture of oxygen in nitrogen. Care must be exercised in this step to avoid that an explosive mixture of oxygen and hydrocarbons is formed.

4. Process to Make Sulfonated Polymers

According to the multiple embodiments disclosed herein, the above prepared block copolymers are sulfonated to obtain a sulfonated polymer product that is in solution and in micellar form. In this micellar form, the sulfonated block copolymer can be neutralized prior to casting a membrane, and at the same time, the risk of gellation and/or precipitation of the sulfonated block copolymer while in solution is reduced.

Without being bound by any particular theory, it is the present belief that the micelle structure of the sulfonated block copolymer can be described as having a core comprising the sulfonated block or blocks having a substantial amount of spent sulfonating agent residues which is surrounded by the sulfonation resistant block or blocks swollen by an organic non-halogenated aliphatic solvent. As will be further described in more detail below, the sulfonated blocks are highly polar due to the presence of sulfonic acid and/or sulfonate ester functional groups. Accordingly, such sulfonated blocks are sequestered into a core of the molecule, while the outer sulfonation resistant polymer block forms a shell which is solvated by a non-halogenated aliphatic solvent. In addition to forming discrete micelle, there may also be formation of polymer aggregates. Without being bound by any particular theory, polymer aggregates can be described as discrete or non-discrete structures resulting from association of polymer chains in ways other than the description provided for micelles, and/or loosely aggregated groups of two or more discrete micelles. Accordingly, the solvated sulfonated block copolymer in micellar form may include discrete micelles and/or aggregates of micelles, with such solution optionally including aggregated polymer chains having structures other than the micelle structure.

As described herein, micelles can be formed as a result of the sulfonation process, or alternatively, the block copolymer may arrange in a micelle structure prior to sulfonation.

In some embodiments, for the formation of micelles, the sulfonation processes as described in WO 2008/089332 may be employed. The methods are useful for preparing sulfonated styrenic block copolymers as described in US 2007/021569.

After polymerization, the polymer can be sulfonated using a sulfonation reagent such as an acyl sulfate in at least one non-halogenated aliphatic solvent. In some embodiments, the precursor polymer can be sulfonated after being isolated, washed, and dried from the reaction mixture resulting from the production of the precursor polymer. In some other embodiments, the precursor polymer can be sulfonated without being isolated from the reaction mixture resulting from the production of the precursor polymer.

a) Solvent

The organic solvent is preferably a non-halogenated aliphatic solvent and contains a first non-halogenated aliphatic solvent which serves to solvate one or more of the sulfonation resistant blocks or non-sulfonated blocks of the copolymer. The first non-halogenated aliphatic solvent may include substituted or unsubstituted cyclic aliphatic hydrocarbons having from about 5 to 10 carbons. Non-limiting examples include cyclohexane, methylcyclohexane, cyclopentane, cycloheptane, cyclooctane and mixtures thereof. The most preferable solvents are cyclohexane, cyclopentane and methylcyclohexane. The first solvent may also be the same solvent used as the polymerization vehicle for anionic polymerization of the polymer blocks.

In some embodiments, the block copolymer may be in micellar form prior to sulfonation even in the case of using only a first solvent. The addition of a second non-halogenated aliphatic solvent to a solution of the precursor polymer in the first non-halogenated aliphatic solvent can result in or assist the "pre-formation" of polymer micelles and/or other polymer aggregates. The second non-halogenated solvent, on the other hand, is preferably chosen such that it is miscible with the first solvent, but is a poor solvent for the sulfonation susceptible block of the precursor polymer in the process temperature range and also does not impede the sulfonation reaction. In other words, preferably, the sulfonation susceptible block of the precursor polymer is substantially insoluble in the second non-halogenated solvent in the process temperature range. In the case where the sulfonation susceptible block of the precursor polymer is polystyrene, suitable solvents which are poor solvents for polystyrene and can be used as the second non-halogenated solvent include linear and branched aliphatic hydrocarbons of up to about 12 carbons, for example, hexane, heptane, octane, 2-ethyl hexane, isooctane, nonane, decane, paraffinic oils, mixed paraffinic solvents, and the like. One preferred example of the second non-halogenated aliphatic solvent is n-heptane.

The pre-formed polymer micelles and/or other polymer aggregates can allow that the sulfonation of the polymer proceeds essentially without disabling gelling at considerably higher concentration than can be achieved without the addition of the second solvent. In addition, this approach can substantially improve the utility of more polar acyl sulfates, such as $C_3$ acyl sulfate (propionyl sulfate), in terms of polymer sulfonation conversion rate and minimization of by-products. In other words, this approach may improve the utility of more polar sulfonation reagents. Such acyl sulfates are further described below.

b) Polymer Concentration

In accordance with some embodiments, high levels of styrene sulfonation can be achieved in a manner that is substantially free of polymer precipitation and free of disabling gelling in the reaction mixture, the reaction product, or both, by maintaining the precursor polymer concentration below a limiting concentration of the precursor polymer, at least during the early stages of sulfonation. It will be understood by those skilled in the art that minor amounts of polymers may deposit on surfaces as a result of localized solvent evaporation in the course of processing in a mixture that is substantially free of polymer precipitation. For example, in accordance with some embodiments, a mixture is considered to be substantially free of polymer precipitation when no more than 5% of the polymer in the mixture has precipitated.

The polymer concentration at which the sulfonation can be conducted is dependent upon the composition of the starting polymer, since the limiting concentration below which polymer gelling is non-disabling or negligible depends upon the polymer composition. As stated above, the limiting concentration may also depend on other factors such as the identity of the solvent or the solvent mixture used and the degree of sulfonation desired. Generally, the polymer concentration falls within the range of from about 1%-wt. to about 30%-wt. alternatively from about 1%-wt. to about 20%-wt., alternatively from about 1%-wt. to about 15%-wt., alternatively from about 1%-wt. to about 12%-wt., or alternatively from about 1%-wt. to about 10%-wt., based on the total weight of a reaction mixture that is preferably substantially free of halogenated solvents. It will be understood by those skilled in the art that suitable ranges include any combination of the specified mol percents even if the specific combination and range is not listed herewith.

In accordance with some embodiments of the presently described technology, the initial concentration of the precursor polymer or mixture of precursor polymers should be maintained below the limiting concentration of the precursor polymer(s), alternatively in the range of from about 0.1%-wt. to a concentration that is below the limiting concentration of the precursor polymer(s), alternatively from about 0.5%-wt. to a concentration that is below the limiting concentration of the precursor polymer(s), alternatively from about 1.0%-wt. to a concentration that is about 0.1%-wt. below the limiting concentration of the precursor polymer(s), alternatively from about 2.0%-wt. to a concentration that is about 0.1%-wt. below the limiting concentration of the precursor polymer(s), alternatively from about 3.0%-wt. to a concentration that is about 0.1%-wt. below the limiting concentration of the precursor polymer(s), alternatively from about 5.0%-wt. to a concentration that is about 0.1%-wt. below the limiting concentration of the precursor polymer(s), based on the total weight of the reaction mixture. It will be understood by those skilled in the art that suitable ranges include any combination of the specified mol percents even if the specific combination and range is not listed herewith.

At least in some embodiments, maintaining the polymer concentration below the limiting concentration can result in reaction mixtures with reduced concentrations of by-product carboxylic acid relative to the higher concentration conditions that lead to gelling.

It will be understood by those skilled in the art, however, that during the production of the sulfonated polymer in some embodiments of the present technology, especially in a semi-batch or continuous production process, the total concentration of the polymers in the reaction mixture may be above the limiting concentration of the precursor polymer.

c) Sulfonation Agent

According to multiple embodiments, acyl sulfate may be used for sulfonating the polymerized block copolymer. The acyl group preferably is derived from a $C_2$ to $C_8$, alternatively $C_3$ to $C_8$, alternatively $C_3$ to $C_5$, linear, branched, or cyclic carboxylic acid, anhydride, or acid chloride, or mixtures thereof. Preferably, these compounds do not contain non-aromatic carbon-carbon double bonds, hydroxyl groups, or any other functionality that is reactive with acyl sulfate or decomposes readily under sulfonation reaction conditions. For example, acyl groups that have aliphatic quaternary carbons in the alpha-position from the carbonyl functionality (e.g., acyl sulfate derived from trimethylacetic anhydride) appear to decompose readily during polymer sulfonation reaction, and preferably should be avoided in the presently described technology. Also included in the scope of useful acyl groups for the generation of acyl sulfate in the present technology are those derived from aromatic carboxylic acids, anhydrides, and acid chlorides such as benzoic and phthalic anhydride. More preferably, the acyl group is selected from the group of acetyl, propionyl, n-butyryl, and isobutyryl. Even more preferably, the acyl group is isobutyryl. It has been discovered that isobutyryl sulfate can afford high degrees of polymer sulfonation and relatively minimal by-product formation.

The formation of acyl sulfate from a carboxylic anhydride and sulfuric acid can be represented by the following reaction:

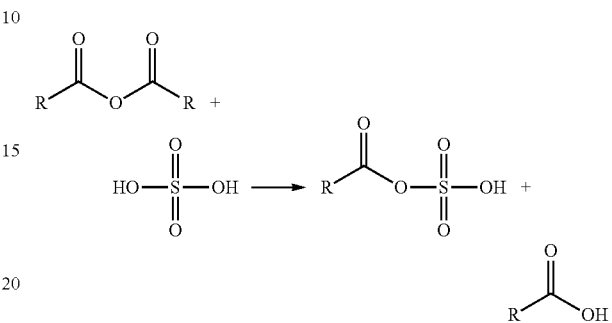

Acyl sulfates are subject to slow decomposition during the course of sulfonation reactions forming alpha-sulfonated carboxylic acids of the following formula:

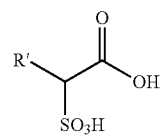

In one embodiment of the presently described technology, the acyl sulfate reagent is obtained from a carboxylic anhydride and sulfuric acid in a reaction that is conducted in a separate "pre-generation" reaction prior to addition to a solution of polymer in a non-halogenated aliphatic solvent. The pre-generation reaction can be conducted with or without a solvent. When a solvent is used to pre-generate the acyl sulfate, the solvent is preferably non-halogenated. Alternatively, the acyl sulfate reagent can be obtained in an in-situ reaction within a solution of the polymer in a non-halogenated aliphatic solvent. In accordance with this embodiment of the present technology, the molar ratio of anhydride to sulfuric acid can be from about 0.8 to about 2, and preferably from about 1.0 to about 1.4. The sulfuric acid used in this preferred method preferably has a concentration of about 93% to about 100% and more preferably has a concentration of about 95% to about 100%, by weight. Those skilled in the art will recognize that oleum may be used as an alternative to sulfuric acid in an in-situ reaction to generate acyl sulfate, provided that the oleum strength is sufficiently low so as to avoid or minimize unintended charring of the reaction mixture.

In another embodiment of the present technology, the acyl sulfate reagent can be obtained from a carboxylic anhydride and oleum in a reaction that is conducted in a separate "pre-generation" reaction prior to addition to a solution of polymer in aliphatic solvent, wherein the oleum strength is in the range of from about 1% to about 60% free sulfur trioxide, alternatively from about 1% to about 46% free sulfur trioxide, alternatively from about 10% to about 46% free sulfur trioxide, and wherein the molar ratio of anhydride to sulfuric acid present in the oleum is from about 0.9 to about 1.2.

Additionally, the acyl sulfate reagent can also be prepared from a carboxylic anhydride via reaction with any combination of sulfuric acid, oleum, or sulfur trioxide. Further, the acyl sulfate reagent can be prepared from a carboxylic acid via reaction with chlorosulfonic acid, oleum, sulfur trioxide, or any combination thereof. Moreover, the acyl sulfate reagent can also be prepared from a carboxylic acid chloride via reaction with sulfuric acid. Alternatively, the acyl sulfate may be prepared from any combination of carboxylic acid, anhydride, and/or acid chloride.

The sulfonation of polymer styrenic repeat units with the acyl sulfate can be represented by the following reaction:

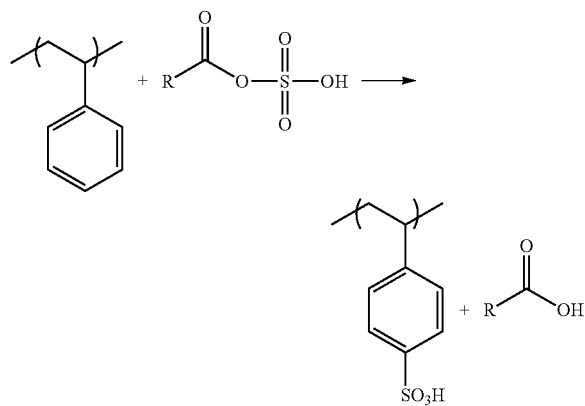

The acyl sulfate reagent may be used relative to the moles of sulfonation susceptible monomer repeat units present in the polymer solution in amounts ranging from very low levels for lightly sulfonated polymer products to high levels for heavily sulfonated polymer products. The molar amount of the acyl sulfate can be defined as the theoretical amount of the acyl sulfate that can be generated from a given method, the amount being dictated by the limiting reagent in the reaction. The molar ratio of acyl sulfate to styrene repeat units (i.e., sulfonation susceptible units) in accordance with some embodiments of the present technology may range from about 0.1 to about 2.0, alternatively from about 0.2 to about 1.3, alternatively from about 0.3 to about 1.0.

In accordance with at least some embodiments of the presently described technology, the degree of sulfonation of the vinyl aromatic monomers susceptible to sulfonation in the block polymers is greater than about 0.4 milliequivalents (meq) sulfonic acid per gram sulfonated polymer (0.4 meq/g), alternatively greater than about 0.6 meq sulfonic acid per gram sulfonated polymer (0.6 meq/g), alternatively greater than about 0.8 meq sulfonic acid per gram sulfonated polymer (0.8 meq/g), alternatively greater than about 1.0 meq sulfonic acid per gram sulfonated polymer (1.0 meq/g), alternatively greater than about 1.4 meq sulfonic acid per gram sulfonated polymer (1.4 meq/g). For example, after the precursor polymers described above are sulfonated in accordance with the methods of the presently described technology, the typical levels of sulfonation are where each B block contains one or more sulfonic functional groups. Preferred levels of sulfonation are from about 10 to about 100 mol percent, alternatively from about 20 to 95 mol percent, alternatively from about 30 to 90 mol percent, and alternatively from about 40 to about 70 mol percent, based on the mol percent of sulfonation susceptible vinyl aromatic monomers in each B block, which can be, for example, unsubstituted styrene monomer, ortho-substituted styrene monomer, meta-substituted styrene monomer, alpha-methylstyrene monomer, 1,1-diphenyl ethylene monomer, 1,2-diphenyl ethylene monomer, a derivative thereof, or a mixture thereof. It will be understood by those skilled in the art that suitable ranges of sulfonation level include any combination of the specified mol percents even if the specific combination and range is not listed herewith.

The level or degree of sulfonation of a sulfonated polymer can be measured by an NMR and/or titration methods as known to people skilled in the art, and/or a method using two separate titrations as described in the Examples below and may be appreciated by people skilled in the art. For example, a resulting solution from the methods of the present technology can be analyzed by $^1$H-NMR at about 60° C. (±20° C.). The percentage styrene sulfonation can be calculated from the integration of aromatic signals in the $^1$H-NMR spectrum. For another example, the reaction product can be analyzed by two separate titrations (the "two-titration method") to determine the levels of styrenic polymer sulfonic acid, sulfuric acid, and non-polymeric by-product sulfonic acid (e.g. 2-sulfo-alkylcarboxylic acid), and then to calculate the degree of styrene sulfonation based on mass balance. Alternatively, the level of sulfonation can be determined by titration of a dry polymer sample, which has been redissolved in tetrahydrofuran with a standardized solution of NaOH in a mixture of alcohol and water. In the latter case, rigorous removal of by-product acids are preferably ensured.

Although embodiments for sulfonating polymers are described above in the context of acyl sulfate reagents, the utility of other sulfonation reagents are also contemplated. For example, the use of those sulfonation reagents derived from the complexation/reaction of sulfur trioxides with phosphate esters such as triethylphosphate has been demonstrated in the present technology. The chemistry of such sulfonation reagents is known in the art to afford aromatic sulfonation with significant degrees of sulfonic acid alkyl ester incorporation. As such, the resultant sulfonated polymers likely contain both sulfonic acid and sulfonic acid alkyl ester groups. Other contemplated sulfonation reagents include, but are not limited to, those derived from the reaction or complexation of sulfur trioxide with phosphous pentoxide, polyphosphoric acid, 1,4-dioxane, triethylamine, etc.

d) Reaction Conditions

The sulfonation reaction between the acyl sulfates and sulfonation susceptible block copolymers such as aromatic-containing polymers (e.g., styrenic block copolymers) can be conducted at a reaction temperature in the range of from about 20° C. to about 150° C., alternatively from about 20° C. to about 100° C., alternatively from about 20° C. to about 80° C., alternatively from about 30° C. to about 70° C., alternatively from about 40° C. to about 60° C. (e.g., at about 50° C.). The reaction time can be in the range of from approximately less than 1 minute to approximately 24 hours or longer, dependent on the temperature of the reaction. In some preferred acyl sulfate embodiments that utilize in situ reaction of carboxylic anhydride and sulfuric acid, the initial temperature of the reaction mixture can be about the same as the intended sulfonation reaction temperature. Alternatively, the initial temperature may be lower than the intended subsequent sulfonation reaction temperature. In a preferred embodiment, the acyl sulfate can be generated in-situ at about 20° C. to about 40° C. (e.g., at about 30° C.) for about 0.5 to about 2 hours, alternatively about 1 to about 1.5 hours, and then the reaction mixture can be heated to about 40° C. to about 60° C. to expedite the completion of the reaction.

Although not required, an optional reaction quenching step can be conducted through the addition of a quenching agent, which can be, for example, water or hydroxyl-containing compounds such as methanol, ethanol, or isopropanol. Typically in such a step, an amount of the quenching agent at least sufficient to react with residual unreacted acyl sulfate may be added.

In some embodiments of the presently described technology, the sulfonation of the aromatic-containing polymer in a non-halogenated aliphatic solvent can be carried out by contacting the aromatic-containing polymer with a sulfonation reagent in a batch reaction or a semi-batch reaction. In some other embodiments of the present technology, the sulfonation can be carried out in a continuous reaction, which can be enabled, for example, through the use of a continuous stirred tank reactor or a series of two or more continuous stirred tank reactors.

5. Process to Neutralize Sulfonated Polymers

According to multiple embodiments, after sulfonation of the block polymers and formation of the micelles as disclosed herein, at least one amine can be added to "neutralize" the sulfonated segments of the block copolymer.

As a result of sulfonation as disclosed above, the micelle cores contain sulfonation susceptible blocks having sulfonic acid and/or sulfonate functionality which are surrounded by an outer shell containing sulfonation resistant blocks of the block copolymer. The driving force for this phase segregation (causing the micelle formation) in solution has been attributed to the vast difference in polarity between the sulfonated segment of the block copolymer and the non-sulfonated blocks of the sulfonated block copolymer. The latter segments are freely solvated by a non-halogenated aliphatic solvent, for example the first solvent disclosed above. On the other hand, the sulfonated polymer moieties are concentrated in the core of micelle. Accordingly, neutralization of the sulfonic acid or sulfonate functionality in the core of the micelle would be expected to reduce the polarity of this segment. With reduced polarity, it would be expected that the driving force for the phase separation and micelle formation would be removed. However, it has been surprisingly found that the amine neutralized block copolymer remained in micelle form in solution. Moreover, and still also surprising, upon casting of the micelle solution, continuous ion channels were formed in the resulting membrane. The continuous ion channels are evidenced by high water transport rates.

It has been surprisingly found that for selected amines the ion channels of the amine neutralized block copolymer transport water as effectively as did those having only sulfonic acid functionality (i.e. non-neutralized sulfonated block copolymer). Furthermore, amine neutralized block copolymers have high dimensional stability as evidenced by low levels of swelling and water uptake.

A broad range of amines may be used according to the method, including multifunctional amines and monofunctional amines, the amine groups in each case being primary, secondary or tertiary amine groups having one, two or three aliphatic and/or aromatic substituents. The substituents of the primary, secondary and tertiary amine groups may be linear, branched, or cyclic aliphatic or aromatic moieties or mixtures of such substituents.

Suitable non-polymeric amines include primary, secondary, and tertiary amines and mixtures thereof wherein the substituents may be linear, branched, or cyclic aliphatic or aromatic moieties or mixtures of the various types of substituents. Aliphatic amines include ethylamine, diethylamine, triethylamine, trimethylamine, cyclohexylamine, and the like. Suitable aromatic amines include pyridine, pyrrole, imidazole, and the like. Analogous polymeric amines include polyethyleneamine, polyvinylamine, polyallylamine, polyvinylpyridene, and the like.

In a preferred embodiment, multi-functional amines are used for neutralization of the sulfonated block copolymer.

Multifunctional amines have two or more nitrogen functionalities, and as such may be capable of acting as ionic cross-linkers when reacted with the sulfonic acid or sulfonate functionality of the starting polymer. While not wanting to be held to any particular theory, generally, it would have been expected that because the multi-functional amines may function as ionic cross-linkers, that during the casting of the micellar solution the spherical ionic core of the micelles would have been retained, and there would have been no ion channels in the membrane for water transport. In such a case there would have been no continuity in the ionic phase in the membrane. Instead, only dispersed ion spheres would have been formed. However, that the membranes formed from the amine neutralized block copolymers are able to transport water at high rates suggests that continuous ion channels have in fact been formed during the casting process. Under these casting conditions, either the multifunctional amines are not functioning as ionic crosslinkers or the crosslinks are labile (moving around on the time scale of the casting process). However, it can be postulated that reorganization of the ionic phase occurs during the casting process In some embodiments, the multifunctional amine may have two to four nitrogen functionalities and may be linked to one another via a $C_2$-$C_4$ linear, branched, or cyclic aliphatic bridging moiety. Accordingly, the multifunctional amine may have two, three, or four nitrogen functionalities.

In some embodiments, the multifunctional amine has the general formula:

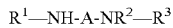

wherein
A is a straight chain or branched alkylene moiety having from two to six carbon atoms;
$R^1$ is hydrogen or $C_1$-$C_6$-alkyl
$R^2$ is hydrogen or $C_1$-$C_6$-alkyl
$R^3$ is $C_1$-$C_6$-alkyl;
or $R^2$ and $R^3$ together with the nitrogen to which they are bonded form a 5 to 7 membered ring made up of 4 to 6 carbon atoms and optionally one or two additional nitrogen ring members wherein the additional nitrogen ring members are independently of one another substituted by hydrogen, $C_1$-$C_6$-alkyl or amino-substituted $C_2$-$C_6$-alkyl.

In still further embodiments, the multi-functional amine is selected from the group consisting of N,N-dimethylethylenediamine, N,N'-dimethylethylenediamine, and 1,4-bis(3-aminopropyl)piperzaine, or mixture thereof.

One example of formation of an amine neutralized sulfonated block copolymer by N,N-dimethylethylenediamine wherein the sulfonated block is styrene may be represented by the following reaction:

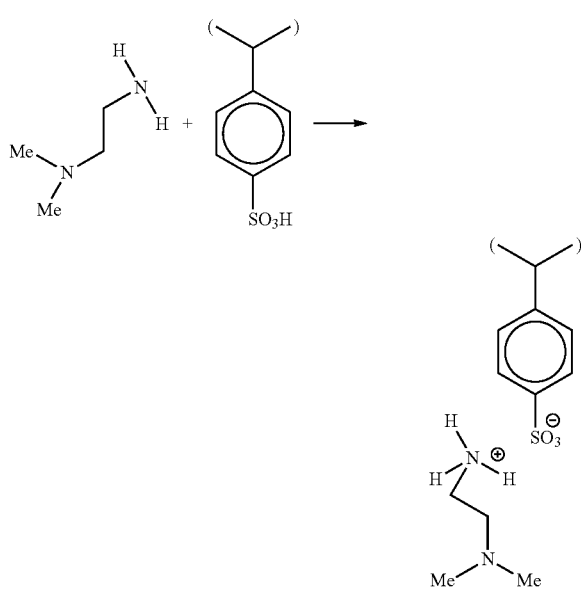

It will be understood by those skilled in the art that the above is exemplary and that other amines discussed herein may be used for neutralization of the sulfonic acid and/or sulfonate ester groups.

The amount of the amine which is employed for neutralizing the sulfonated block copolymer depends upon the moles of sulfonic acid or sulfonate ester groups present in the sulfonated block copolymer and on the desired level of neutralization. When the amount of amine is less than about 80% of the stoichiometric amount with respect to the sulfonic acid or sulfonate ester groups present in the sulfonated block copolymer, the amine will normally react quantitatively. For levels of neutralization above about 80%, it has been found to be advantageous to employ the amine compound in excess. Normally, the amount of amine may be employed in amounts ranging from about 50% to about 2000% of the stoichiometric amount with respect to the sulfonic acid or sulfonate ester functionalities of the sulfonated block copolymer.

In some embodiments the amine may be added in at least about 60%, particularly at least about 70%, more particularly at least about 80%, or at least about 100% of the stoichiometric amount with respect to the sulfonic acid or sulfonate ester groups present in the sulfonated block copolymer. Further, the amine may be added in at most about 1500%, particularly at most about 750%, more particularly at most about 500%, or at most about 250% or at most about 200%, of the stoichiometric amount with respect to the sulfonic acid or sulfonate ester groups present in the sulfonated block copolymer. It will be understood by those skilled in the art that suitable ranges include any combination of the specified stoichiometric amounts even if the specific combination and range is not listed herewith.

The amount of the amine which is employed for neutralizing the sulfonated block copolymer further depends upon the number of nitrogen functionalities. Without wanting to be bound by any particular theory, it is believed that one sulfonic acid or sulfonate ester group may be neutralized by one nitrogen functionality in the amine compound. Accordingly, an amine having two nitrogen functionalities may neutralize two sulfonic acid or sulfonate ester groups, an amine having three nitrogen functionalities may neutralize three sulfonic acid or sulfonate ester groups, etc. Therefore, the aforementioned stoichiometric amounts of the amine are based on the number of nitrogen functionalities in the amine compound.

In some embodiments, the amine base is generally used for neutralizing of the sulfonation groups in an amount of from about 0.75 to about 10 equivalents of amine base per 1 equivalent of sulfonic acid or sulfonate ester group. In other embodiments there may be added 0.8 equivalents to about 5 equivalents of amine base per 1 equivalent of sulfonic acid or sulfonate ester group. In further embodiments, there may be added 0.9 equivalents to about 2 equivalents of amine base per 1 equivalent of sulfonic acid or sulfonate ester group. In still further embodiments, there may be added 0.95 equivalents to about 1 equivalents of amine base per 1 equivalent of sulfonic acid or sulfonate ester group. In additional embodiments, there may be added about 1 equivalent of amine base per 1 equivalent of sulfonic acid or sulfonate ester group. It will be understood by those skilled in the art that suitable ranges include any combination of the specified equivalents even if the specific combination and range is not listed herewith.

The level of neutralization may be adjusted within broad ranges, e.g., from about 70% to about 100% of the sulfonic acid or sulfonate ester groups being neutralized by at least one charge equivalent to one mole of the amine per equivalent of sulfonic acid functionality in the block copolymer. In other embodiments the level of neutralization is at least about 80%, particularly at least about 85%, more particularly at least about 90% of the sulfonic acid or sulfonate ester groups being neutralized by at least one charge equivalent and up to one mole of the amine per equivalent of sulfonic acid functionality in the block copolymer. In some embodiments, at most about 95%, preferably at most about 98%, more particularly 100%, of the sulfonic acid or sulfonate ester groups are neutralized by at least one charge equivalent and up to one mole of the amine per equivalent of sulfonic acid functionality in the block copolymer.

In some of the embodiments, the level of neutralization may be higher where the non-neutralized block copolymer has a lower degree of sulfonation, e.g., where the degree of sulfonation of the non-neutralized block copolymer is in a range of from about 10 to about 70 mol %, the level of neutralization may be in a range of from 90 to 100%. In other embodiments, the level of neutralization may be lower where the non-neutralized block copolymer has a higher degree of sulfonation, e.g., where the degree of sulfonation of the non-neutralized block copolymer is in a range of about 65 to 100 mol %, the level of neutralization may be in a range of from about 75% to 100%. Higher levels of neutralization have surprisingly been found to reduce the tendency of the neutralized sulfonated block copolymer to swell when employed in an aqueous environment.

The neutralization reaction may normally be conducted at a temperature in the range of from −40° C. to the boiling point of the solvent or solvent mixture. The reaction may be exothermic, i.e., may increase the temperature of the reaction medium by about 10 to 20° C., depending on the nature of the amine, the amount per time in which the amine is added, and on the degree to which the block copolymer is sulfonated. In some of the embodiments, the temperature may be in the range of from about −40° C. to about +100° C., or from about 20° C. to about +60° C.

The expression "reaction time" in this context is understood to be the interval of time starting when all of the reactants have been combined and ending when the neutralization reaction has reached completion. Generally, the reaction time may range from approximately less than 1 minute to approximately 24 hours or longer. Preferably, completion is reached within about 1 hour, or within 30 minutes.

The neutralized sulfonated block copolymer may be separated from the reaction mixture by evaporating the reaction solvent(s) optionally at a reduced pressure and optionally at an elevated temperature. In some embodiments, the reaction mixture comprising the neutralized sulfonated block copolymers may be used without further processing to cast films or membranes.

6. Properties of Neutralized Block Polymers

The amine neutralized sulfonated block copolymers as described herein possess unexpectedly superior properties. It was found that neutralizing the sulfonated block copolymers provided a plasticizing effect on the block copolymers. In other words, the amine neutralized block copolymer exhibits a lower tensile modulus in the dry state than a corresponding non-neutralized sulfonated block copolymer. As a result, when immersed in water, the amine neutralized block copolymer exhibits a wet tensile modulus which is essentially the same or only slightly lower than the modulus in the dry state. Therefore, according to some embodiments, in both wet and dry states, the neutralized block copolymer will have the same or similar modulus. This has the advantage of a neutralized block copolymer that is plasticized by the same modifier in both the wet and dry conditions; as a result, the material will have a same or similar tensile modulus in both wet and dry states. Such a material will retain its softness and drape performance independent of the humidity of the environment. It was also surprisingly found that in addition to these properties, the neutralized block copolymers also exhibit high water vapor transport rates and very good dimensional stability.

Accordingly, as the sulfonated block copolymer is plasticized upon being neutralized by the amines described herein, in some embodiments, the dry tensile modulus is equal to or less than the corresponding, non-neutralized sulfonated block copolymer. In other embodiments the dry tensile modulus is decreased to the range of from 10% to 99% of the tensile modulus of the corresponding, non-neutralized sulfonated block copolymer. In other embodiments, the dry tensile modulus is decreased to the range of from 50% to 95% of the tensile modulus of the corresponding, non-neutralized sulfonated block copolymer. In further embodiments, the dry tensile modulus is decreased to the range of from 60% to 90% of the tensile modulus of the corresponding, non-neutralized sulfonated block copolymer. In still further embodiments, the dry tensile modulus is decreased to the range of from 65% to 80% of the tensile modulus of the corresponding, non-neutralized sulfonated block copolymer. In even further embodiments, the dry tensile modulus is decreased to the range of from 70% to 75% of the tensile modulus of the corresponding, non-neutralized sulfonated block copolymer. It will be understood by those skilled in the art that suitable ranges include any combination of the specified percentages even if the specific combination and range is not listed herewith.

Furthermore the tensile modulus of an amine neutralized block copolymer may be the same or similar in both the wet and dry states. Accordingly, in some embodiments, the amine neutralized block copolymer disclosed herein has a wet tensile modulus that is not less than 20% of the dry tensile modulus. In other embodiments, the wet tensile modulus is not less than 35% of the dry tensile modulus. In additional embodiments, the wet tensile modulus is not less than 50% of the dry tensile modulus. In other embodiments, the wet tensile modulus is not less than 65% of the dry tensile modulus. In further embodiments, the wet tensile modulus is not less than 75% of the dry tensile modulus. In still further embodiments, the wet tensile modulus is not less than 85% of the dry tensile modulus. In other embodiments, the wet tensile modulus is not less than 90% of the dry tensile modulus. In other embodiments, the wet tensile modulus is not less than 95% of the dry tensile modulus. It will be understood by those skilled in the art that suitable ranges include any combination of the specified percentages even if the specific combination and range is not listed herewith.

Furthermore, in some embodiments, the wet tensile strength at break of the neutralized block copolymer is at least about 50% of the dry tensile strength at break. In other embodiments, the wet tensile strength at break of the neutralized block copolymer is at least about 75% of the dry tensile strength at break. In further embodiments, the wet tensile strength at break of the neutralized block copolymer is at least about 90% of the dry tensile strength at break. In further embodiments, the wet tensile strength at break of the neutralized block copolymer is at about the same as the dry tensile strength at break. It will be understood by those skilled in the art that suitable ranges include any combination of the specified percentages even if the specific combination and range is not listed herewith.

It has also been found that the amine neutralized block copolymers disclosed herein have surprisingly high water vapor transport rates while at the same time having very good dimensional stability. It was surprisingly found that the water vapor transport rate (WVTR) of the sulfonated block copolymers is the same or similar to the WVTR of a corresponding non-neutralized block copolymer, and in some embodiments may have a higher WVTR. Accordingly, in some embodiments the WVTR is at least about 50% of the WVTR of a corresponding non-neutralized sulfonated block copolymer. In other embodiments, the WVTR is at least about 65% of the WVTR of a corresponding non-neutralized sulfonated block copolymer. In further embodiments, the WVTR is at least about 75% of the WVTR of a corresponding non-neutralized sulfonated block copolymer. In still further embodiments, the WVTR is at least about 85% of the WVTR of a corresponding non-neutralized sulfonated block copolymer. In even further embodiments, the WVTR is at least about 90% of the WVTR of a corresponding non-neutralized sulfonated block copolymer. In additional embodiments, the WVTR is at least about 95% of the WVTR of a corresponding non-neutralized sulfonated block copolymer. In further embodiments, the WVTR is at least about 99% of the WVTR of a corresponding non-neutralized sulfonated block copolymer. It will be understood by those skilled in the art that suitable ranges include any combination of the specified percentages even if the specific combination and range is not listed herewith.

In some embodiments, the WVTR may also be quantified using the inverted cup method in terms of $g/m^2/day/mil$ which is the number of g of water which are transported through the membrane into a 50% relative humidity atmosphere at 25 C. using a membrane having 1 $m^2$ of exposed area and 1 mil of thickness in a day of exposure. Accordingly, in some embodiments the WVTR of at least about 15,000 $g/m^2/day/mil$. In other embodiments, the WVTR is at least about 18,000 $g/m^2/day/mil$. In further embodiments, the WVTR is at least about 20,000 $g/m^2/day/mil$. In even further embodiments, the WVTR is at least about 22,000 $g/m^2/day/mil$. In still further embodiments, the WVTR is at least about 23,000 $g/m^2/day/mil$. It will be understood by those skilled in the art that suitable ranges include any combination of the specified rates even if the specific combination and range is not listed herewith.

It has been surprisingly found that a high WVTR can be obtained while also maintaining very good dimensional stability. Dimensional stability can refer to the overall physical shape of a membrane or article comprising the neutralized block copolymer. Thus, polymers with good dimensional stability are more likely to maintain their form, and are less likely to sag or change shape in the presence of water. While there are a number of ways to measure the dimensional stability of a block copolymer, including measuring the length, width, and thickness of a membrane in both wet and dry states, one method includes measuring the water uptake of the block copolymer membrane.

Accordingly, the expression "water uptake value" as used herein refers to the weight of water which is absorbed by a block copolymer in equilibrium as compared to the original weight of the dry block copolymer, and is calculated as a percentage. A lower water uptake value indicates that less water has been absorbed and therefore corresponds to a better dimensional stability.

The surprising and advantageous dimensional stability is desirable in water management membranes, i.e., in applications where a membrane is constrained in a mounting device and small changes in the dimensions of the membrane may cause buckling and tearing, thereby inevitably causing the performance of the device to degrade or even fail. The surprising and advantageous dimensional stability is also desirable, for example, for desalination applications, humidity regulation devices, battery separators, fuel cell exchange membranes, medical tubing applications and the like.

In one embodiment, the water uptake value is equal to or less than the water uptake value of a corresponding, non-neutralized sulfonated block copolymer. In other embodiments, the water uptake value is less than 80% the water uptake value of the corresponding, non-neutralized block copolymer. In additional embodiments, the water uptake value is less than 50% the water uptake value of the corresponding, non-neutralized block copolymer. In further embodiments, the water uptake value is less than 25% the water uptake value of the corresponding, non-neutralized block copolymer.

Furthermore, in some embodiments, the water uptake value of the neutralized block copolymer is from 5% to 100% of the dry polymer. In other embodiments, the water uptake value of the neutralized block copolymer is from 20% to 75% of the dry polymer. In additional embodiments, the water uptake value of the neutralized block copolymer is from 20% to 50% of the dry polymer. In further embodiments, the water uptake value of the neutralized block copolymer is from 20% to 40% of the dry polymer. In still further embodiments, the water uptake value of the neutralized block copolymer is from 20% to 35% of the dry polymer. It will be understood by those skilled in the art that suitable ranges include any combination of the specified percentages even if the specific combination and range is not listed herewith.

7. Applications of the Neutralized Block Copolymers

The neutralized sulfonated block copolymers may be compounded with other components not adversely affecting the copolymer properties. The neutralized block copolymers may be blended with a large variety of other polymers, including olefin polymers, styrene polymers, hydrophilic polymers and engineering thermoplastic resins, with polymer liquids and other fluids such as ionic liquids, natural oils, fragrances, and with fillers such as nanoclays, carbon nanotubes, fullerenes, and traditional fillers such as talcs, silica and the like.

Additionally, the neutralized sulfonated block copolymers may be blended with conventional styrene/diene and hydrogenated styrene/diene block copolymers, such as the styrene block copolymers available from Kraton Polymers LLC. Illustrative styrene block copolymers include linear S-B-S, S-I-S, S-EB-S, S-EP-S block copolymers. Also included are radial block copolymers based on styrene along with isoprene and/or butadiene and selectively hydrogenated radial block copolymers. Particularly useful are blends with the block copolymer precursor, the block copolymer prior to sulfonation.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha olefin copolymers, and other alpha olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EEA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like). Still other polymers included hereunder are polyvinyl chloride (PVC) and blends of PVC with other materials.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene, sulfonated polystyrene and styrene/olefin copolymers. Representative styrene/olefin copolymers are substantially random ethylene/styrene copolymers, preferably containing at least 20, more preferably equal to or greater than 25%-wt. copolymerized styrene monomer.

Hydrophilic polymers include polymeric bases which are characterized as having an available pair of electrons for interaction with acids. Examples of such bases include polymeric amines such as polyethyleneamine, polyvinylamine, polyallylamine, polyvinylpyridene, and the like; polymeric analogs of nitrogen containing materials such as polyacrylamide, polyacrylonitrile, nylons, ABS, polyurethanes and the like; polymeric analogs of oxygen containing compounds such as polymeric ethers, esters, and alcohols; and acid-base hydrogen bonding interactions when combined with glycols such as polyethylene glycol, and polypropylene glycol, and the like, polytetrahydrofuran, esters (including polyethylene terephthalate, polybutyleneterephthalate, aliphatic polyesters, and the like), and alcohols (including polyvinylalcohol), poly saccharides, and starches. Other hydrophilic polymers that may be utilized include sulfonated polystyrene. Hydrophilic liquids such as ionic liquids may be combined with the polymers of the present invention to form swollen conductive films or gels. Ionic liquids such as those described in U.S. Pat. No. 5,827,602 and U.S. Pat. No. 6,531,241 (which disclosures are herein incorporated by reference) may be introduced into the neutralized sulfonated polymers either by swelling a previously cast membrane, or by adding to the solvent system before casting a membrane, coating a film or forming a fiber.

Illustrative materials that may be used as additional components include, without limitation: (1) pigments, antioxidants, stabilizers, surfactants, waxes, and flow promoters; (2) particulates, fillers and oils; and (3) solvents and other materials added to enhance processability and handling of the composition.

Pigments, antioxidants, stabilizers, surfactants, waxes and flow promoters, when utilized in combination with the neutralized sulfonated block copolymers may be included in amounts up to and including 10%-wt., i.e., from 0 to 10%, based on the total weight of the composition. When any one or more of these components are present, they may be present in an amount from about 0.001 to about 5%-wt., and more preferably from about 0.001 to about 1%-wt.

Particulates, fillers and oils may be present in an amount up to and including 50%-wt., from 0 to 50% based on the total weight of the composition. When any one or more of these components are present, they may be present in an amount from about 5 to about 50%-wt., preferably from about 7 to about 50%-wt.

It will be understood by those having ordinary skill in the art that the amount of solvents and other materials added to enhance processability and handling of the composition will in many cases depend upon the particular composition formulated as well as the solvent and/or other material added. Typically such amount will not exceed 50%, based on the total weight of the composition The amine neutralized sulfonated block copolymers described herein can be employed in a variety of applications and end uses, and their property profile renders them particularly suited as materials in applications which require high modulus when immersed in water, good wet strength, good dimensional stability, good water and proton transport characteristics, good methanol resistance, easy film or membrane formation, good barrier properties, controlled flexibility and elasticity, adjustable hardness, and thermal/oxidative stability.

In one embodiment of the present invention, the amine neutralized sulfonated block copolymers may be used in electrochemical applications, such as in fuel cells (separator phase), proton exchange membranes for fuel cells, dispersions of metal impregnated carbon particles in sulfonated polymer cement for use in electrode assemblies, including those for fuel cells, water electrolyzers (electrolyte), acid batteries (electrolyte separator), super capacitors (electrolyte), separation cell (electrolyte barrier) for metal recovery processes, sensors (particularly for sensing humidity) and the like. The amine neutralized sulfonated block copolymers are also used as desalination membranes, and in coatings on porous membranes. Their selectivity in transporting gases makes them useful for gas separation applications. Additionally, the amine neutralized sulfonated block copolymers are used in protective clothing and breathable fabric applications where the membranes, coated fabrics, and fabric laminates could provide a barrier of protection from various environmental elements (wind, rain, snow, chemical agents, biological agents) while offering a level of comfort as a result of their ability to rapidly transfer water from one side of the membrane or fabric to the other, e.g., allowing moisture from perspiration to escape from the surface of the skin of the wearer to the outside of the membrane or fabric and vice versa. Full enclosure suits made from such membranes and fabrics may protect first responders at the scene of an emergency where exposure to smoke, a chemical spill, or various chemical or biological agents is a possibility. Similar needs arise in medical applications, particularly surgery, where exposure to biological hazards is a risk. Surgical gloves and drapes fabricated from these types of membranes are other applications that could be useful in a medical environment. Articles fabricated from these types of membranes could have antibacterial and/or antiviral and/or antimicrobial properties as reported in U.S. Pat. No. 6,537,538, U.S. Pat. No. 6,239,182, U.S. Pat. No. 6,028,115, U.S. Pat. No. 6,932,619 and U.S. Pat. No. 5,925,621 where it is noted that polystyrene sulfonates act as inhibitory agents against HIV (human immunodeficiency virus) and HSV (herpes simplex virus. In personal hygiene applications, a membrane or fabric of the present invention that would transport water vapor from perspiration while providing a barrier to the escape of other bodily fluids and still retain its strength properties in the wet environment would be advantageous. The use of these types of materials in diapers and adult incontinence constructions would be improvements over existing technologies.

Accordingly, in some embodiments, the amine neutralized sulfonated block copolymers described herein are particularly employed as materials for water vapor transporting membranes which are employed in wet or aqueous environments. Such membranes are, for example useful in devices for controlling humidity, devices for forward electrodialysis, devices for reverse electrodialysis, devices for pressure retarded osmosis, devices for forward osmosis, devices for reverse osmosis, devices for selectively adding water, devices for selectively removing water, and batteries.

8. Examples

The following examples are intended to be illustrative only, and are not intended to be, nor should they be construed as, limiting the scope of the present invention in any way.

a. Materials and Methods

The tensile modulus in the dry state as described herein was measured according to ASTM D412.

The tensile modulus in the wet state as described herein was measured similar to the method according ASTM D412 using samples that had been equilibrated under water for a period of 24 hours prior to testing, and that were fully submerged under water for testing.

All tensile data were collected in a climate controlled room at 74° F. (23.3° C.) and 50% relative humidity.

The WVTR as described herein was measured similar to ASTM E 96/E96M. The ASTM method was modified by using a smaller vial, employing 10 ml of water, and having an area of exposed membrane of 160 mm$^2$ (as opposed to 1000 mm$^2$ according to the ASTM method). After adding the water and sealing the vial with the membrane test specie, the vial was inverted, and air having a temperature of 25° C. and a relative humidity of 50% was blown across the membrane. Weight loss was measured versus time, and the water transport rate was calculated on the basis of the measurements as g/m$^2$, or as g mil/m$^2$ when normalized for thickness of the tested membrane.

The degree of sulfonation as described herein and as determined by titration was measured by the following potentiometric titration procedure. The non-neutralized sulfonation reaction product solution was analyzed by two separate titrations (the "two-titration method") to determine the levels of styrenic polymer sulfonic acid, sulfuric acid, and non-polymeric by-product sulfonic acid (2-sulfoisobutyric acid). For each titration, an aliquot of about five (5) grams of the reaction product solution was dissolved in about 100 mL of tetrahydrofuran and about 2 mL of water and about 2 mL of methanol were added. In the first titration, the solution was titrated potentiometrically with 0.1 N cyclohexylamine in methanol to afford two endpoints; the first endpoint corresponded to all sulfonic acid groups in the sample plus the first acidic proton of sulfuric acid, and the second endpoint corresponded to the second acidic proton of sulfuric acid. In the second titration, the solution was titrated potentiometrically with 0.14 N sodium hydroxide in about 3.5:1 methanol:water to afford three endpoints: The first endpoint corresponded to all sulfonic acid groups in the sample plus the first and second acidic proton of sulfuric acid; the second endpoint corresponded to the carboxylic acid of 2-sulfoisobutyric acid; and the third endpoint corresponded to isobutyric acid.

The selective detection the of the second acidic proton of sulfuric acid in the first titration, together with the selective detection of the carboxylic acid of 2-sulfoisobutyric acid in the second titration, allowed for the calculation of acid component concentrations.

The degree of sulfonation as described herein and as determined by $^1$H-NMR was measured using the following procedure. About two (2) grams of non-neutralized sulfonated polymer product solution was treated with several drops of methanol and the solvent was stripped off by drying in a 50° C. vacuum oven for approximately 0.5 hours. A 30 mg sample of the dried polymer was dissolved in about 0.75 mL of tetrahydrofuran-$d_8$ (THF-$d_8$), to which was then added with a partial drop of concentrated $H_2SO_4$ to shift interfering labile proton signals downfield away from aromatic proton signals in subsequent NMR analysis. The resulting solution was analyzed by $^1$H-NMR at about 60° C. The percentage styrene sulfonation was calculated from the integration of $^1$H-NMR signal at about 7.6 part per million (ppm), which corresponded to one-half of the aromatic protons on sulfonated styrene units; the signals corresponding to the other half of such aromatic protons were overlapped with the signals corresponding to non-sulfonated styrene aromatic protons and tert-butyl styrene aromatic protons.

The ion exchange capacity as described herein was determined by the potentiometric titration method described above and was reported as milliequivalents of sulfonic acid functionality per gram of sulfonated block copolymer.

The formation of micelles was confirmed by particle size analysis on a Malvern Zetasizer Nano Series dynamic light scattering instrument, model number ZEN3600, available from Malvern Instruments Limited, UK, using polymer sample solutions diluted to a concentration of about 0.5 to 0.6%-wt. with cyclohexane. The diluted polymer solution samples were placed in a 1 cm acrylic cuvette and subjected to the instrument's general purpose algorithm for determination of size distribution as a function of intensity (see A. S. Yeung and C. W. Frank, Polymer, 31, pages 2089-2100 and 2101-2111 (1990)).

b. Experiments
Preparation of Non-Neutralized Sulfonated Block Copolymer SBC-1

A pentablock copolymer having the configuration A-D-B-D-A was prepared by sequential anionic polymerization where the A blocks are polymer blocks of para-tert-butylstyrene (ptBS), the D blocks were comprised of polymer blocks of hydrogenated isoprene (Ip), and the B blocks were comprised of polymer blocks of unsubstituted styrene (S). Anionic polymerization of the t-butylstyrene in cyclohexane was inititated using sec-butyllithium affording an A block having a molecular weight of 15,000 g/mol. Isoprene monomers were then added to afford a second block with a molecular weight of 9,000 g/mol (ptBS-Ip-Li). Subsequently, styrene monomer was added to the living (ptBS-Ip-Li) diblock copolymer solution and was polymerized to obtain a living triblock copolymer (ptBS-Ip-S-Li). The polymer styrene block was comprised only of polystyrene having a molecular weight of 28,000 g/mol. To this solution was added another aliquot of isoprene monomer resulting in an isoprene block having a molecular weight of 11,000 g/mol. Accordingly, this afforded a living tetrablock copolymer structure (ptBS-Ip-S-Ip-Li). A second aliquot of para-tert butyl styrene monomer was added, and polymerization thereof was terminated by adding methanol to obtain a ptBS block having a molecular weight of about 14,000 g/mol. The ptBS-Ip-S-Ip-ptBS was then hydrogenated using a standard $Co^{2+}$/triethylaluminum method to remove the C=C unsaturation in the isoprene portion of the pentablock. The block polymer was then sulfonated directly (without further treatment, not oxidizing, washing, nor "finishing") using an i-butyric anhydride/sulfuric acid reagent. The hydrogenated block copolymer solution was diluted to about 10% solids by the addition of heptane (roughly an equal volume of heptane per volume of block copolymer solution). Sufficient i-butyric anhydride and sulfuric acid (1/1 (mol/mol)) were added to afford 2.0 meq of sulfonated polystyrene functionality per g of block copolymer. The sulfonation reaction was terminated by the addition of ethanol (2 mol ethanol/mol of i-butyric anhydride) The resulting polymer was found, by potentiometric titration, to have an "Ion Exchange Capacity (IEC)" of 2.0 meq of —$SO_3H$/g of polymer. The solution of sulfonated polymer had a solids level of about 10% wt/wt in a mixture of heptane, cyclohexane, and ethyl i-butyrate.

Cast Membrane Neutralization Procedure

Prior to the neutralization procedure further described below, an initial test was conducted to neutralize an already cast membrane of the SBC-1 polymer. Accordingly, a 20 mil thick film of the SBC-1 polymer solution was drawn onto a 16" by 16" silanized glass plate. The film was allowed to dry overnight in a casting chamber at 1 atmosphere, a relative humidity of 50%, and at room temperature (ca. 25° C.), to afford a membrane of approximately 1 mil thickness.

The membrane was contacted with several amines. However, when contacting the membrane with certain of the amines, the membrane disintegrated or dissolved in the amine.

| Did not dissolve the Membrane | Dissolved the Membrane |
|---|---|
| Pentaethylenehexamine | N,N,N',N'-Tetraethyldiethylenetriamine |
| Tetraethylenepentamine | N,N'-Dimethylethylenediamine |
| 1,4-Bis(3-aminopropyl)piperazine | N,N-Dimethylethylenediamine |

In an alternative approach, a membrane was soaked in water for a period of approximately a day and subsequently contacted with a solution of the amine in water (about 10% wt amine in water). This prevented the membranes from dissolving, however, when the membranes that had been treated in this manner were dried under vacuum, voids developed in the membranes. Having voids in the films makes them undesirable for selective permeation applications.

Accordingly, the amines which dissolve the membrane could not be used for neutralizing an already cast membrane comprised of the sulfonated block copolymer.

Micellar Neutralization Procedure

In a representative experiment, after sulfonation of the SBC-1 block copolymer as described above and without casting into a membrane, 100 g of solution having 10 g of SBC-1 polymer (and accordingly 20 meq of —$SO_3H$) was diluted with an additional 40 g of cyclohexane. N,N-Dimethylethylenediamine (1.86 g, 20 mmol) was added dropwise to the stirred sulfonated copolymer solution over a period of about 30 minutes. A modest exotherm was observed (about 3° C.) (heat of neutralization). The solution was stirred for another 30 minutes with no noticeable increase in viscosity.

A 20 mil thick film of the neutralized polymer solution was drawn onto a 16" by 16" silanized glass plate. The film was allowed to dry overnight in a casting chamber at 1 atmosphere, at a relative humidity of 50%, and at room temperature, to afford a membrane that was approximately 1 mil thick.

The procedure was repeated as described but using one of the following amines in the indicated amount instead of 20 mmol of N,N-dimethylethylenediamine:
N,N'-Dimethylethylenediamine—1.85 g, 20 mmol
1,4-Bis(3-aminopropyl)piperazine—4.05 g, 20 mmol
Tetraethylenepentamine—3.89 g, 20 mmol
Pentaethylenehexamine—4.66 g, 20 mmol Table 1 summarizes the neutralized block copolymers obtained in that manner.

TABLE 1

| Block copolymer | Amine | Mol % sulfonic groups neutralized |
| --- | --- | --- |
| SBC-1 | None | 0% |
| NSBC-1 | N,N-Dimethylethylenediamine | 100% |
| NSBC-2 | N,N'-Dimethylethylenediamine | 100% |
| NSBC-3 | 1,4-bis(3-Aminopropyl)piperazine | 100% |
| NSBC-4 | Tetraethylenepentamine | 100% |
| NSBC-5 | Pentaethylenehexamine | 100% |

As shown in Table 1 above, SBC-1 is a sulfonated block copolymer which has not been neutralized by an amine. Further, NSBC-1, NSBC-2 and NSBC-3 were neutralized with multi-functional amines having nitrogen functionalities between 2 and 4, while NSBC-4 and NSBC-5 were neutralized with amines having nitrogen functionalities of 5 and 6, respectively. The block copolymers as noted in Table 1 were tested with respect to various performance properties. The test results are summarized in Table 2 as follows:

block copolymer. As indicated in Table 1, both amines N,N'-dimethylethylenediamine and N,N-dimethylethylenediamine had the effect of dissolving the cast sulfonated block copolymer membrane and therefore could not be used for neutralizing a membrane formed of the non-neutralized sulfonated block copolymer. However, as shown in Table 2, all investigated amines were successfully used to neutralize the sulfonated block copolymer in a micellar solution, and the neutralized micellar solutions were successfully cast into useful membranes which were free of voids. Moreover, the data show that in polymers NSBC-1 through NSBC-5, the dry tensile modulus decreased as compared to the non-neutralized SBC-1 copolymer, thus illustrating the plasticizing effect of amine addition. At the same time, wet tensile strengths were no less than 50% of the wet tensile strengths of the control membrane which was in the non-neutralized form. While the amine neutralized membranes were plasticized by neutralization with an amine, they retained their wet strength performance. Membranes, which were prepared by neutralization with amines according to embodiments of the present invention, had lower dry modulus values that were lower than had been observed for the control membrane and importantly had wet modulus values which were closer in value to the dry modulus values than had been observed for the control membrane. The membranes of the present invention will afford performance which is less sensitive to environmental humidity levels than was observed for the control membrane. Furthermore, the water uptake values of the membranes obtained from the amine neutralized sulfonated block copolymers were significantly lower than those of the corresponding non-neutralized SBC-1 copolymer. This is a reflection of the improvement in dimensional stability for the amine neutralized materials.

Additionally surprising and unexpected was that NSBC-1, NSBC-2, and NSBC-3 produced superior results showing a combination of exceptional performance properties. As shown in the results of Table 2, the dry tensile modulus for these neutralized block copolymers decreased as compared to the non-neutralized SBC-1 block copolymer. In addition to this, the membranes obtained from the amine neutralized sulfonated block copolymers maintained the high WVTR of the non-neutralized SBC-1. This is a surprising result as

TABLE 2

| Block copolymer | tensile type | Stress at break (psi) | Strain at break (%) | Strain at yield (%) | Stress at yield (psi) | WVTR g/m$^2$/day/mil | Water uptake (%) | Modulus (psi) |
| --- | --- | --- | --- | --- | --- | --- | --- | --- |
| SBC-1 | dry | 2363 | 271 | 4.5 | 1760 | | | 65,765 |
| | wet | 1208 | 260 | no yield | No Yield | 23,745 | 144 | 3,068 |
| NSBC-1 | dry | 1312 | 158 | 4.11 | 1441 | | | 60,080 |
| | wet | 1288 | 287 | 10.3 | 544 | 22,713 | 31.5 | 14,245 |
| NSBC-2 | dry | 1442 | 284 | 5.5 | 1004 | | | 32,394 |
| | wet | 1537 | 308 | 8.7 | 685 | 24,323 | 38.6 | 19,822 |
| NSBC-3 | dry | 1736 | 213 | 3.7 | 1203 | | | 50,368 |
| | wet | 997 | 241 | 14.1 | 455 | 18,977 | 41.2 | 15,093 |
| NSBC-4 | dry | 1563 | 324 | 4.6 | 740 | | | 28,779 |
| | wet | 1092 | 230 | 6.9 | 772 | 1,167 | 19.7 | 22,521 |
| NSBC-5 | dry | 1440 | 245 | 4 | 859 | | | 36,696 |
| | wet | 1440 | 264 | 8 | 723 | 1,681 | 8.5 | 19,383 |

"Tensile type" refers to the condition of the membrane at the time of testing.
Membranes were evaluated "dry" as cast and "wet", immersed in water after equilibration with an excess of water for over 24 hours. Tensile tests on 1 inch "dumbbell" shaped samples were performed "dry" in a room (70 F.) where the relative humidity was controlled at 50% (ASTM D 412), the analogous "wet" sample was measured immersed in water.
"modulus" was determined at 300% elongation.

The results in Table 2 demonstrate that amine neutralization of a sulfonated block copolymer in a micellar solution imparts superior properties to the neutralized sulfonated WVTR values are typically correlated directly with water uptake values for membranes of this type. Moreover, even while the WVTR have been maintained, the membranes obtained from the amine neutralized sulfonated block copolymers exhibited significantly lower water uptake values than the non-neutralized SBC-1 block copolymer. Accordingly, even with high WVTR, the block copolymers NSBC-1, NSBC-2, and NSBC-3 have improved dimensional stability over the non-neutralized SBC-1 (31.5%, 38.6%, 41.2% water uptake respectively versus 144% water uptake for SBC-1) Therefore, the data show that neutralization with amines having from two to four nitrogen functionalities produce unexpectedly advantageous results.

Table 3 below further demonstrates the dimensional stability of the tested block copolymers by illustrating the change in physical dimensions of the membranes after having been immersed in water to equilibrium.

TABLE 3

| Block copolymer | tensile type | Length (in.) | | | Width (in.) | | | Thickness (in.) | | |
|---|---|---|---|---|---|---|---|---|---|---|
| | | Before | After | Percent Increase | Before | After | Percent Increase | Before | After | Percent Increase |
| SBC-1 | a | 2 | 2.2770 | 13.9 | 1 | 1.1860 | 18.6 | 0.00165 | 0.00205 | 24.2 |
| | b | 2 | 2.0870 | 4.4 | 1 | 1.1990 | 19.9 | 0.00155 | 0.00205 | 32.3 |
| NSBC-1 | a | 2 | 1.9650 | −1.8 | 1 | 0.9440 | −5.6 | 0.00100 | 0.00110 | 10.0 |
| | b | 2 | 2.0190 | 1.0 | 1 | 1.0110 | 1.1 | 0.00095 | 0.00110 | 15.8 |
| NSBC-2 | a | 2 | 2.0230 | 1.2 | 1 | 1.0500 | 5.0 | 0.00135 | 0.00140 | 3.7 |
| | b | 2 | 1.9700 | −1.5 | 1 | 1.0400 | 4.0 | 0.00130 | 0.00140 | 7.7 |
| NSBC-3 | a | 2 | 2.0850 | 4.3 | 1 | 1.0390 | 3.9 | 0.00120 | 0.00135 | 12.5 |
| | b | 2 | 2.0780 | 3.9 | 1 | 1.0300 | 3.0 | 0.00115 | 0.00135 | 17.4 |
| NSBC-4 | a | 2 | 1.9230 | −3.9 | 1 | 0.9970 | −0.3 | 0.00115 | 0.00120 | 4.3 |
| | b | 2 | 1.9310 | −3.5 | 1 | 0.9860 | −1.4 | 0.00120 | 0.00120 | 0.0 |
| NSBC-5 | a | 2 | 1.9050 | −4.8 | 1 | 0.9650 | −3.5 | 0.00120 | 0.00135 | 12.5 |
| | b | 2 | 1.9140 | −4.3 | 1 | 0.9810 | −1.9 | 0.00130 | 0.00140 | 7.7 |

"Before" refers to the measurement of the dry membrane prior to immersion in water;
"After" refers to a measurement taken after achieving equilibrium in an excess of water;
"Percent Increase" reflects in increase in size of the membrane upon equilibration in water, a negative number reflects the level of shrinkage, a positive number reflects expansion upon wetting the sample;
"a" and "b" are arbitrary names assigned to two different samples of the same block copolymer which were tested.

As shown in Table 3, all investigated amine neutralized block copolymers demonstrated significant improvement over the non-neutralized SBC-1 copolymer in terms of dimensional stability. The dimensional increase of the amine neutralized block copolymers was in each case lower than that of the corresponding non-neutralized SBC-1 copolymer. Dimensional stability in water is a factor in evaluating performance properties for membranes on this type. In many applications, these membranes are cycled from wet to dry conditions and back again to wet. Membranes which swell and shrink depending upon the humidity of the environment tend to buckle (excess water) and tear (dry conditions) during cycling. This behavior often leads to mechanical failure of the membrane. Furthermore, as noted above, NSBC-1, NSBC-2, and NSBC-3, in addition to having exceptional dimensional stability, additionally had high WVTR.

What is claimed is:

1. A process for preparing a membrane comprising a sulfonated block copolymer, said process comprising:
providing a solution comprising an organic solvent and the non-neutralized block copolymer in micellar form, and
adding at least one amine to the solution, wherein the amine is a multi-functional amine having from two to four nitrogen functionalities, and comprises at least two nitrogen functionalities which are linked to one another via a linear, branched, or cyclic aliphatic bridging moiety, and subsequently forming said solution into a membrane comprising the sulfonated block copolymer,
wherein the sulfonated block copolymer prior to neutralization has at least one end block A and at least one interior block B wherein each A block contains essentially no sulfonic acid or sulfonate ester functional groups and each B block is a polymer block containing from about 10 to about 100 mol percent sulfonic acid or sulfonate ester functional groups based on the number of monomer units of the B block and which are not neutralized,
wherein each A block comprises one or more segments selected from polymerized (i) para-substituted styrene monomers, (ii) ethylene, (iii) alpha olefins of 3 to 18 carbon atoms, (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof;
each B block comprises segments of one or more vinyl aromatic monomers selected from polymerized (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene and (vii) mixtures thereof.

2. The process of claim 1 wherein from 80% or more of the sulfonic acid or sulfonate ester functional groups are neutralized.

3. The process of claim 1 wherein the amine is added in an amount of from about 0.8 to about 10 equivalents of amine base per 1 equivalent of sulfonic acid or sulfonate ester functional group of the non-neutralized block copolymer.

4. The process of claim 1 wherein the organic solvent is a non-halogenated aliphatic solvent.

5. The process of claim 1 wherein the organic solvent comprises at least a first and a second aliphatic solvent, and wherein the B block is substantially soluble in the first solvent and the A block is substantially soluble in the second solvent.

6. The process of claim 1 wherein the amine is a multi-functional amine having from two to three nitrogen functionalities.

7. The process of claim 1, wherein the sulfonated block copolymer has the general configuration A-B-A, A-B-A-B-A, (A-B-A)$_n$X, (A-B)$_n$X, A-D-B-D-A, A-B-D-B-A, (A-D-B)$_n$X, (A-B-D)$_n$X or mixtures thereof, where n is an integer from 2 to about 30, and X is a coupling agent residue and wherein each D block is a polymer block resistant to sulfonation and the plurality of A blocks, B blocks, or D blocks are the same or different.

8. The process of claim 7 wherein each D block is selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

9. A membrane comprising a neutralized sulfonated block copolymer which is solid in water comprising at least two polymer end blocks A and at least one polymer interior block B, wherein
  a. each A block contains essentially no sulfonic acid or sulfonate ester functional groups and each B block is a polymer block containing from about 10 to about 100 mol percent sulfonic acid or sulfonate ester functional groups based on the number of monomer units of the B block;
  b. wherein each A block comprises one or more segments selected from polymerized (i) para-substituted styrene monomers, (ii) ethylene, (iii) alpha olefins of 3 to 18 carbon atoms, (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof;
  c. each B block comprises segments of one or more vinyl aromatic monomers selected from polymerized (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene and (vii) mixtures thereof,
  d. the sulfonated B blocks are neutralized with a multifunctional amine having from two to four nitrogen functionalities, wherein from 95% to 100% of the sulfonic acid or sulfonate ester functional groups in the B block are neutralized,
  wherein the multi-functional amine comprises at least two nitrogen functionalities which are linked to one another via a linear, branched, or cyclic aliphatic bridging moiety.

10. The membrane of claim 9 wherein the multi-functional amine has 2 or 3 nitrogen functionalities.

11. The membrane of claim 9 wherein the bridging moiety has 2 to 4 carbons.

12. The membrane of claim 9, wherein the multifunctional amine has the general formulae:

wherein
A is a straight chain or branched alkylene moiety having from two to six carbon atoms;
$R^1$ is hydrogen or $C_1$-$C_6$-alkyl
$R^2$ is hydrogen or $C_1$-$C_6$-alkyl
$R^3$ is $C_1$-$C_6$-alkyl;
or $R^2$ and $R^3$ together with the nitrogen to which they are bonded form a 5 to 7 membered ring made up of 4 to 6 carbon atoms and optionally one or two additional nitrogen ring members wherein the additional nitrogen ring members are independently of one another substituted by hydrogen, $C_1$-$C_6$-alkyl or amino-substituted $C_2$-$C_6$-alkyl.

13. The membrane of claim 9, wherein the multi-functional amine is selected from the group consisting of N,N-dimethylethylenediamine, N,N'-dimethylethylenediamine and 1,4-bis(3-aminopropyl)piperzine, or mixture thereof.

14. The membrane of claim 9 which meets one or both of the following provisions:
  a. the neutralized block copolymer has a water uptake value which is equal to or less than the water uptake value of a corresponding, non-neutralized sulfonated block copolymer; and/or
  b. the neutralized block copolymer has a dry tensile modulus which is equal to or less than the dry tensile modulus of the corresponding, non-neutralized sulfonated block copolymer, the modulus measured according to ASTM D412.

15. The membrane of claim 9 having a water uptake value of less than 80% the water uptake value of a corresponding, non-neutralized sulfonated block copolymer.

16. The membrane of claim 9 having a water uptake value of less than 100% of its dry weight.

17. The membrane of claim 9 a water vapor transport rate of at least 15,000 g/m²/day/mil.

18. The membrane of claim 9, having a water transport rate of at least about 50% of the water transport rate of a corresponding non-neutralized block copolymer.

19. The membrane of claim 15, having a water transport rate of at least about 50% of the water transport rate of a corresponding non-neutralized block copolymer.

20. The membrane of claim 19, the neutralized block copolymer has a dry tensile modulus which is less than the dry tensile modulus of the corresponding, non-neutralized sulfonated block copolymer, the modulus measured according to ASTM D412.

21. The membrane of claim 9 which is in hydrated form.

22. The hydrated membrane of claim 21 which meets both of the following provisions:
  a. the hydrated membrane has a water transport rate of at least about 50% of the water transport rate of a hydrated form of a corresponding, non-neutralized sulfonated block copolymer;
  b. the hydrated membrane has a water uptake value of less than 80% the water uptake value of a corresponding, non-neutralized sulfonated block copolymer.

23. The membrane of claim 9 having a general configuration A-B-A, A-B-A-B-A, $(A-B-A)_nX$, $(A-B)_nX$, A-D-B-D-A, A-B-D-B-A, $(A-D-B)_nX$, $(A-B-D)_nX$ or mixtures thereof, where n is an integer from 2 to about 30, and X is a coupling agent residue and wherein each D block is a polymer block resistant to sulfonation and the plurality of A blocks, B blocks, or D blocks are the same or different.

24. The membrane of claim 23 comprising one or more blocks D each block D being independently selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

25. The process of claim 1, wherein the multi-functional amine is selected from the group consisting of N,N-dimethylethylenediamine, N,N'-dimethylethylenediamine, and 1,4-bis(3-aminopropyl)piperzine, or a mixture thereof.

26. The process of claim 1, wherein the multi-functional amine is selected from the group consisting of N,N-dimethylethylenediamine, N,N'-dimethylethylenediamine, or a mixture thereof.

27. The membrane of claim 9, wherein the multi-functional amine is selected from the group consisting of N,N-dimethylethylenediamine, N,N'-dimethylethylenediamine, or a mixture thereof.

* * * * *